US012456155B2

(12) United States Patent
Aurongzeb et al.

(10) Patent No.: US 12,456,155 B2
(45) Date of Patent: Oct. 28, 2025

(54) SYSTEM AND METHOD FOR TRACKING GREENHOUSE GAS EMISSIONS ASSOCIATED WITH APPLICATION AND POWER USAGE AT AN INFORMATION HANDLING SYSTEM

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 625 days.

(21) Appl. No.: 17/874,041

(22) Filed: Jul. 26, 2022

(65) Prior Publication Data

US 2024/0037684 A1 Feb. 1, 2024

(51) Int. Cl.
*G06Q 50/26* (2024.01)
*G06Q 30/018* (2023.01)

(52) U.S. Cl.
CPC .......... *G06Q 50/26* (2013.01); *G06Q 30/018* (2013.01)

(58) Field of Classification Search
CPC ............................ G06Q 30/018; G06Q 50/26
See application file for complete search history.

(56) References Cited

U.S. PATENT DOCUMENTS

| 8,626,450 B2 | 1/2014 | Dooley |
| 9,760,474 B2 | 9/2017 | Pillai |
| 10,429,921 B2 | 10/2019 | Potlapally |
| (Continued) | | |

FOREIGN PATENT DOCUMENTS

WO 2011/106160 A2 9/2011

OTHER PUBLICATIONS

C. Herrmann, et al., "Sustainability as Strategic Business Model for Profitable Business," 6 pages, May 2014.
(Continued)

*Primary Examiner* — An H Do
(74) *Attorney, Agent, or Firm* — Prol Intellectual Property Law, PLLC; H. Kenneth Prol

(57) ABSTRACT

A carbon dioxide (CO2) emission tracking system operating on a client information handling system may include a processor, a network interface device, and a display to display a graphical user interface (GUI) to gather analytics for an executing software application hardware power consumption analytics, and a location for the client information handling system, the processor to receive from a Unified Endpoint Management (UEM) platform a distributed power CO2 emissions value estimating CO2 emission per Watt of power consumed at the location, determine a power CO2 emissions value estimating CO2 emitted during a measured consumption of power, based on the hardware power consumption analytics, determine an application CO2 emissions value estimating CO2 emitted by the software application during consumption of hardware resources contributing to the power CO2 emissions value, and display the power CO2 emissions value to provide a carbon footprint for computing activities of the client information handling system.

20 Claims, 5 Drawing Sheets

(56) References Cited

U.S. PATENT DOCUMENTS

| | | | |
|---|---|---|---|
| 10,803,405 B1 | 10/2020 | Levchuk | |
| 11,164,406 B2 * | 11/2021 | Meroux | G08G 1/0141 |
| 12,056,031 B2 * | 8/2024 | Aurongzeb | G06F 11/3409 |
| 2009/0292617 A1 | 11/2009 | Sperling | |
| 2010/0070404 A1 | 3/2010 | McConnell | |
| 2014/0100937 A1 | 4/2014 | Na | |
| 2014/0114867 A1 | 4/2014 | Volkmann | |
| 2014/0316964 A1 | 10/2014 | Slutsker | |
| 2017/0123857 A1 | 5/2017 | Khan | |
| 2021/0004328 A1 | 1/2021 | Wang | |

OTHER PUBLICATIONS

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

* cited by examiner

SYSTEM AND METHOD FOR TRACKING GREENHOUSE GAS EMISSIONS ASSOCIATED WITH APPLICATION AND POWER USAGE AT AN INFORMATION HANDLING SYSTEM

FIELD OF THE DISCLOSURE

The present disclosure generally relates to determining an amount of greenhouse gas emissions that may be attributable to usage at an information handling system of software applications and power. More specifically, the present disclosure relates to a CO2 emission tracking system for tracking such greenhouse gas emissions over time and making recommendations for application usage that may reduce such emissions.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
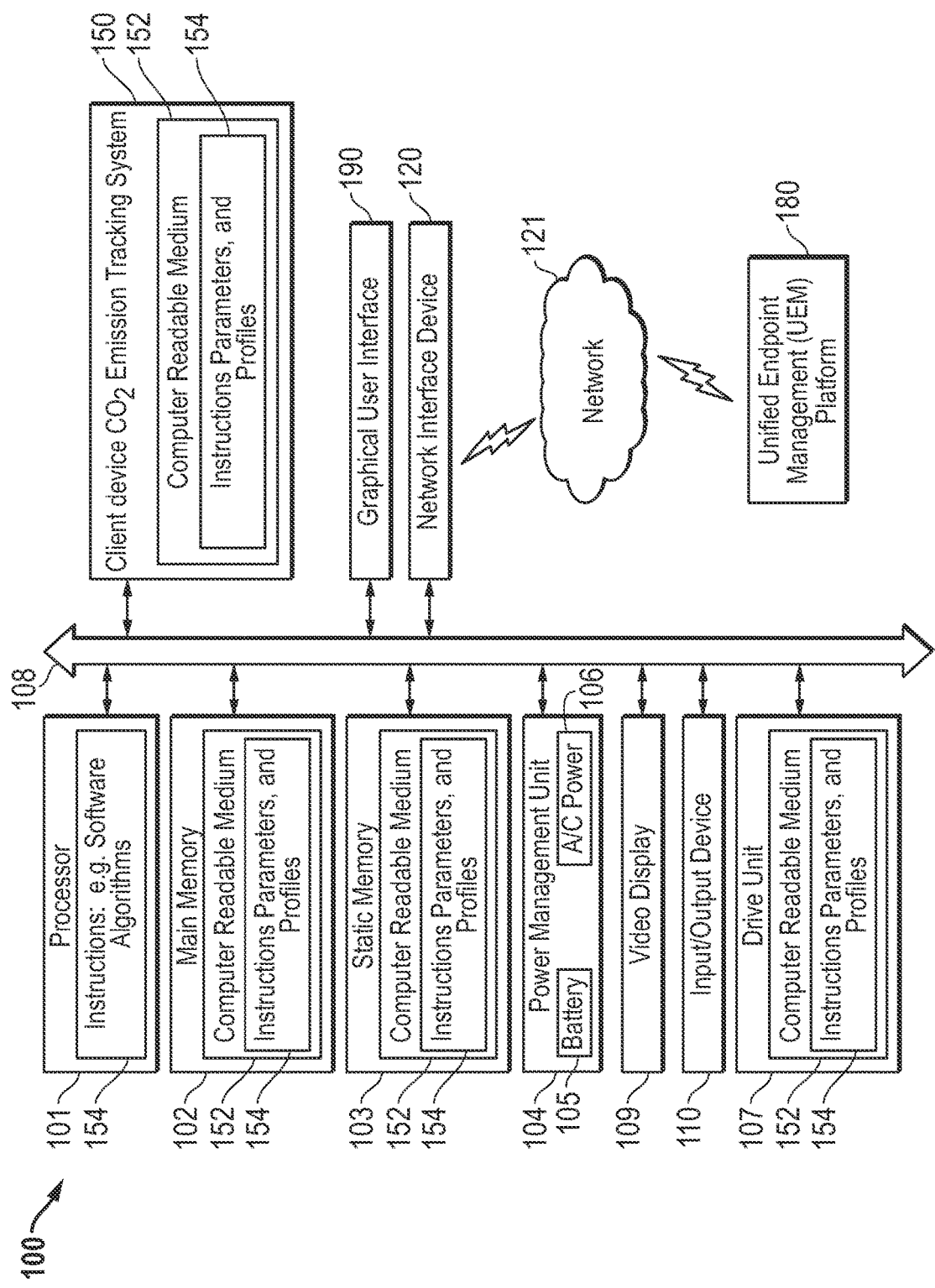
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. One major impact on such GHG emissions is the use of software applications and consumption of power at end devices such as information handling systems operated by an end user. The client device CO2 emission tracking system in embodiments of the present disclosure address this issue by routinely tracking and reporting equivalent CO2 emissions generated due to consumption of power and execution of software applications at the client information handling system over preset monitoring periods.

Although execution of a software application does not generate any direct greenhouse gases (GHGs), such as carbon dioxide ($CO_2$), such execution may contribute to indirect emissions of $CO_2$. For example, a software application may require access to and wear on hardware, the replacement of which is associated with GHG emissions during manufacture. As another example, a software application may require access to network infrastructure that similarly must routinely replace hardware, causing GHG emissions. The client device CO2 emission tracking system described herein may determine an equivalent CO2 emissions value associated with such hardware or network infrastructure use by a plurality of software applications operating at the client information handling system to inform the user as to the carbon footprint associated with execution of each of such software applications over time.

The client device CO2 emission tracking system in embodiments described herein may further track and report CO2 emissions generated due to the consumption of power at the client information handling system. Because CO2 emissions per kilowatt/hour (kWh) vary based on the power plant (e.g., coal, oil, renewable energy) supplying such power, the CO2 emissions generated due to consumption of power may also vary based on the location of the client information handling system. Display of such power CO2 emissions values may allow the user of the client information handling system to better understand the impact of location on carbon footprint for the client information handling system.

Recommendations for adjustments to software application usage may be made by the client device CO2 emission tracking system in various embodiments described herein. For example, the current application CO2 emissions values for a client information handling system may be significantly higher than previous application CO2 emissions values for that client information handling system or significantly higher than average application CO2 emissions values for other client information handling systems. In such scenarios, the client device CO2 emission tracking system may identify one or more problematic software applications causing such a marked increase in current application CO2 emissions values. The client device CO2 emission tracking system in various embodiments described herein may recommend, via a graphical user interface, that the user of the client information handling system either terminate the problematic software application(s), or limit the hardware and networking resources made available to the problematic software application(s) during execution. In such a way, the client device CO2 emission tracking system may inform a user of a client information handling system how execution of software applications may impact the carbon footprint of the client information handling system and make recommendations for minimizing that carbon footprint, where appropriate.

FIG. 1 illustrates an information handling system 100 according to several aspects of the present disclosure. In particular, in the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include a memory 102, (with computer readable medium 154 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a network interface device 120, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101 executing instructions of a client device carbon dioxide (CO2) emission tracking system 150, the wireless network interface device 120, a static memory 103 or drive unit 107, a video display 109 or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 154, such as for the client device CO2 emission tracking system 150 that may operate on servers or systems, remote data centers, or on-box in individual client information handling systems 100 according to various embodiments herein. In some embodiments, it is understood any or all portions of code instructions 154 may operate on a plurality of information handling systems 100.

The information handling system 100 may include a processor 101 such as a central processing unit (CPU), a graphics processing unit (GPU), a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 154 storing instructions 154. In some embodiments, information handling system 100, or portions thereof, may represent a client information handling system 100 operating various hardware components (e.g., processor 101, memory 102, network interface device 120, power management unit 104) during execution of various software applications, operating system (OS) software, application software, BIOS software, or other software applications or drivers detectable by processor type 101, and executing an agent of the client device CO2 emission tracking system 150, as described in greater detail below with respect to FIG. 2. In other embodiments the information handling system 100 may represent a server information handling system of a remote Unified Endpoint Management (UEM) platform 180 in communication with the client information handling system 100 via the network 121.

The disk drive unit 107 and static memory 103 may also contain space for data storage in a computer readable medium 154. The instructions 154 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110, or the like.

The network interface device 120 may provide connectivity of the information handling system 100 to the network 121 via a dedicated link, a network AP or base station in an embodiment. The network 121 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 121 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 121, one or more APs for those networks, or to a docking station in an embodiment may be via wired or wireless connection. In some aspects of the present disclosure, the network interface device 120 may operate two or more wireless links. In other aspects of the present disclosure, the information handling system 100 may include a plurality of network interface devices, each capable of establishing a separate wireless link to network 121, such that the information handling system 100 may be in communication with network 121 via a plurality of wireless links.

The network interface device 120 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 120, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 120 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 154 or receives and executes instructions, parameters, and profiles 154 responsive to a propagated signal, so that a device connected to a network 121 may communicate voice, video or data over the network 121. Further, the instructions 154 may be transmitted or received over the network 121 via the network interface device 120. The information handling system 100 may include a set of instructions 154 that may be executed to cause the computer system to perform any one or more of the methods or computer-based functions disclosed herein, such as determining an amount of greenhouse gas emissions that may be attributable to usage at an information handling system of software applications and power, tracking such greenhouse gas emissions over time, and making recommendations for application usage that may reduce such emissions. For example, instructions 154 may include a particular example of a client device CO2 emission tracking system 150, or other aspects or components. Various software modules comprising application instructions 154 may be coordinated by an operating system (OS), and/or via an application programming interface (API). An example operating system may include Windows®, Android®, and other OS types. Example APIs may include Win 32, Core Java API, or Android APIs. Application instructions 154 may also include any application processing drivers, or the like executing on information handling system 100.

The client device CO2 emission tracking system 150 may utilize a computer-readable medium 154 in which one or more sets of instructions 154 may operate in part as software or firmware instructions executed on the information handling system 100. The instructions 154 may embody one or more of the methods or logic as described herein. For example, instructions relating to the client device CO2 emission tracking system 150, firmware or software algorithms, processes, and/or methods may be stored here. Such instructions 154 may comprise determining an amount of greenhouse gas emissions that may be attributable to usage at an information handling system of software applications and power, tracking such greenhouse gas emissions over time, and making recommendations for application usage that may reduce such emissions. The client device CO2 emission tracking system 150 may operate at a client information handling system 100 in communication with a Unified Endpoint Management (UEM) platform 180 that gathers telemetries from a plurality of client information handling systems (e.g., including 100) via the network 121 that describe operating environments for those client information handling systems (e.g., 100). The UEM platform 180 in an embodiment may operate to identify information technology (IT) issues at client information handling systems (e.g., 100), and to provide support for such issues, including automatically updating drivers or hardware components, as needed. The UEM platform 180 in an embodiment may operate as a cloud-based service to store data (e.g., operating environment telemetries for remote client information handling systems) within memory 102, static memory 103, or computer readable medium 154 received via network 121. In some embodiments the information handling system 100 may be a server executing a UEM platform 180. In other embodiments, the information handling system 100 may depict a client information handling system that reports to a UEM 180 and receives information about other client information handling systems from the UEM 180 pursuant to various embodiments described herein.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 154 of the client device CO2 emission tracking system 150 may be stored in static memory 103, or the drive unit 107 on a computer-readable medium 154 such as a flash memory or magnetic disk in an example embodiment. More specifically, telemetries describing heat measurements, executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
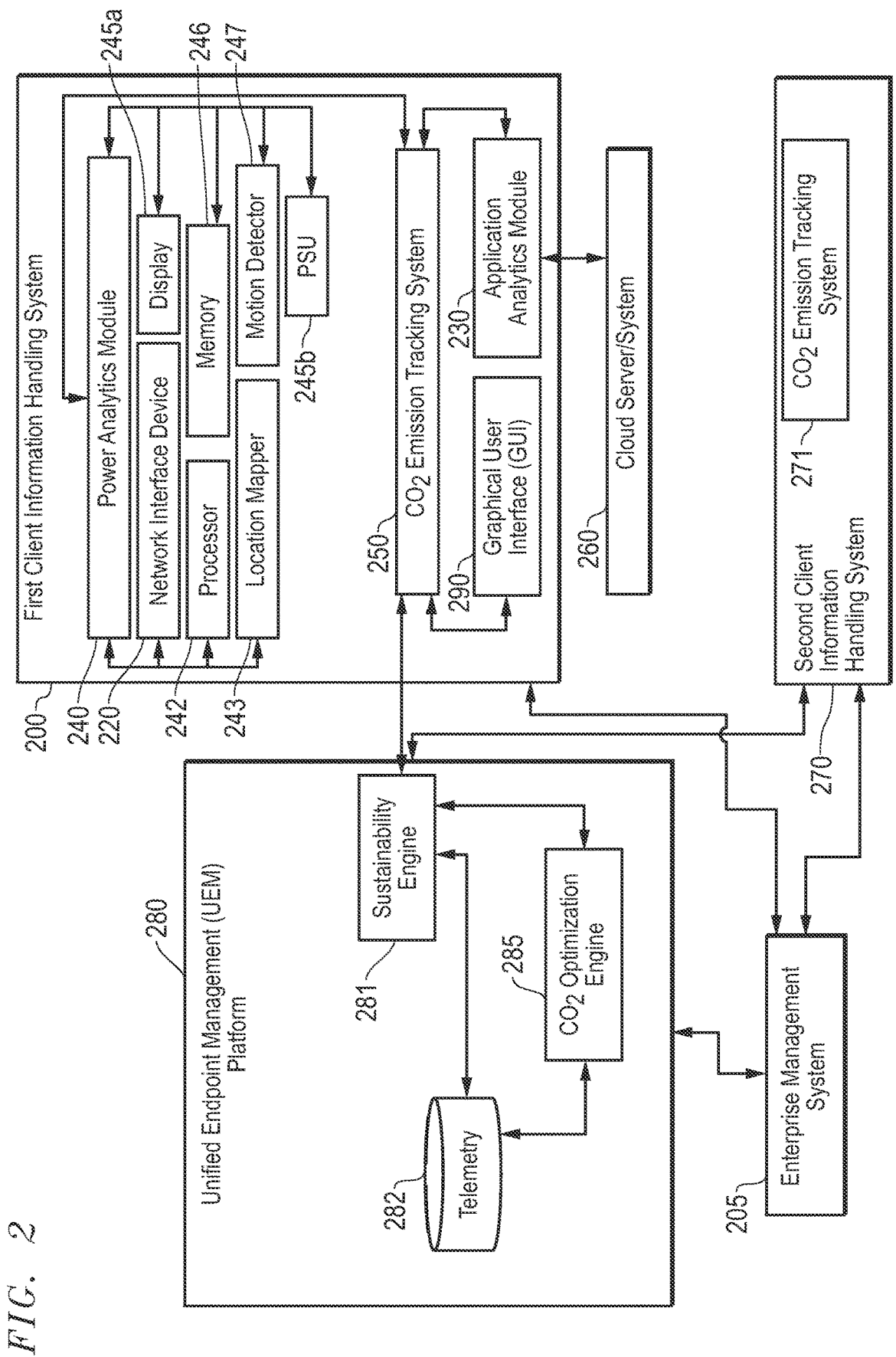
FIG. 2 is a block diagram illustrating a client device CO2 emission tracking system of a client information handling system according to an embodiment of the present disclosure.

FIG. 2 is a block diagram illustrating a client device CO2 emission tracking system of a client information handling system communicating CO2 emissions associated with application and power usage at the client information handling system to a sustainability engine according to an embodiment of the present disclosure. A first client information handling system 200 in an embodiment may execute a client device CO2 emission tracking system 280 under management of or in communication with an enterprise management system 205, which may act as an interface between a plurality of client information handling systems (e.g., 200 or 270) and a unified endpoint management (UEM) platform 280. The UEM platform 280 and enterprise management system 205 in an embodiment may operate as a cloud-based service in communication with the enterprise management system 205 via a network to identify information technology (IT) issues at a first client information handling system 200, or a second client information handling system 270. The UEM platform 280 may also provide support for such issues, including automatically updating drivers or hardware components, as needed. In a specific embodiment of the present disclosure, the UEM platform 280 may gather telemetries from a plurality of client information handling system (e.g., 200 and 270) that describe operating environments for those client information handling systems (e.g., power usage by a plurality of hardware components, or analytics for software usage).

A client device CO2 emission tracking system 250 operating at the UEM platform 280 in an embodiment may determine an amount of greenhouse gas (GHG) emissions that may be attributable to usage at an information handling system of software applications and power, and recommend adjustments to software application usage to minimize such emissions. This tracking and generation of recommendations may be made based upon telemetry data gathered from a pool of information handling systems including 200 and 270, and others in various embodiments. The UEM platform 280 may receive such telemetries from a plurality of client information handling systems (e.g., 200 and 270), which may be managed by the same enterprise management system (e.g., 205), or may be managed by separate enterprise management systems in various embodiments.

Each client information handling system (e.g., 200 or 270) in an embodiment may include a plurality of hardware components. For example, a first client information handling system 200 in an embodiment may include a network interface device 220, a processor (e.g., central processing unit (CPU), graphics processing unit (GPU), or visual processing unit (VPU)) 242, a display 245a, and a memory 246, and one or more components of a power supply unit 245b (e.g., battery). In some embodiments, the first client information handling system 200 may further include one or more sensing devices, such as a motion detector 247, or location sensor 243 or other location sensing devices (e.g., GPS location unit) also referred to as a location mapper 243.

A power analytics module 240 in an embodiment may be in communication with various hardware components (e.g., 220, 242, 243, 245a, 245b, 246, or 247) and firmware for those components in an embodiment. For example, the power analytics module 240 may monitor power consumption by each of the various hardware components (e.g., 220, 242, 243, 245a, 245b, 246, or 247) in an embodiment. In another example embodiment, the power analytics module 240 may also access firmware for hardware components (e.g., 220, 242, 243, 245a, 245b, 246, or 247) to determine policies or settings for those components at the time of such power measurements.

More specifically, the power analytics module 240 in an embodiment may determine whether a network interface device 220 is transceiving according to WLAN, WWAN, Bluetooth®, or Near Field Communication (NFC) standards, as well as policies setting a preference for one type of standard over another, or restrictions on power consumption, data rate, or frequencies used by the network interface device 220. In another example, the power analytics module 240 in an embodiment may determine current usage of processing resources by software applications as a percentage of total capacity for the processor 242 (e.g., central processing unit (CPU), graphics processing unit (GPU), or visual processing unit (VPU)). In still another example, the power analytics module may determine current usage of memory resources by software applications as a percentage of total capacity for memory 246, time required to process requests to access such memory 246, and identify software applications most frequently accessing such memory 246. In yet another example, the power analytics module 240 in an embodiment may determine a current usage of the display by software applications as a percentage of display time in which GUI for a specific software application is visible, and a usage mode for the display 245a, such as day mode, night mode, power reserve mode, or gaming mode (e.g., high-resolution).

In another example, the power analytics module 240 in an embodiment may determine current usage of network interface device resources by software applications as a percentage of total capacity for the network interface device 220 to transceive data (e.g., percentage of total available throughput used). In still another example embodiment, the power analytics module 240 may determine policies controlling the periods in which sensing hardware may be operational. More specifically, the power analytics module 240 in an embodiment may determine whether the motion detector 247, or location sensor (e.g., GPS unit) 243 are set to remain on at all times, to operate only when a laptop or mobile information handling system is in a certain position (e.g., closed or open), to operate when a mobile device is currently moving, or to operate only when a user is actively executing software applications or certain software applications. All information accessed in such a way by the power analytics module 240 in an embodiment may be communicated to the CO2 emission tracking system 250.

The CO2 emission tracking system 250 in an embodiment may use these received power consumption values, separated according to specific software applications' usages of those resources to determine when a specific software application is consuming an inordinate proportion of a hardware device's resources, possibly increasing power consumed by that device. Each hardware component may be associated with a stored resource threshold value indicating a maximum percentage of that components' resources that should be consumed by any given software application. For example, the processor 242 may be associated with a maximum processor resource threshold value of 85%, indicating that no software application currently executing at the first information handling system 200 should be consuming more than 85% of the processor's 242 resources (e.g., as measured by a percentage of total calls made to that processor 242). As another example, the memory 246 may be associated with a maximum memory resource threshold value of 85%, indicating that no software application currently executing at the first information handling system 200 should be consuming more than 85% of the memory's 246 resources (e.g., as measured by a percentage of total bytes of data stored at the memory 246). In yet another example, the network interface device 220 may be associated with a maximum network interface device resource threshold value of 85%, indicating that no software application currently executing at the first information handling system 200 should be consuming more than 85% of the network interface device's 220 resources (e.g., as measured by a percentage of total throughput transceived by the network interface device 220). In still another example, the display 245a may be associated with a maximum display resource threshold value of 85%, indicating that no software application currently executing at the first information handling system 200 should be consuming more than 85% of the display's 245*a* resources (e.g., as measured by a percentage of active screen time used in the display of the specific software application's GUI via the display 245*a*).

The power analytics module 240 in an embodiment may also be capable of adjusting such policies within firmware for one or more hardware components, upon user approval. For example, the power analytics module 240 in an embodiment may instruct a network interface device 220 to transceive according to the Bluetooth®, rather than WLAN or WWAN, or reset policies for the network interface device 220 to restrict power consumption, data rate, or frequencies used. In another example, the power analytics module 240 in an embodiment may adjust the usage mode for the display 245*a* to a lower power consumption mode, such as power reserve mode, or lower resolution mode. In still another example embodiment, the power analytics module 240 may decrease the periods in which sensing hardware may be operational, such as restricting such periods to when the first client information handling system 200 is in a closed position, an idle or sleep mode, currently moving, or in startup mode.

In an embodiment, the power analytics module 240 may also be capable of determining the current versions of drivers for various hardware components (e.g., 220, 242, 243, 245*a*, 245*b*, 246, or 247). In some embodiments, the power analytics module 240 may receive updated drivers, direct installation of those drivers, or pause repeated attempts at unsuccessful driver installations in order to increase efficiency of associated hardware components (e.g., 220, 242, 243, 245*a*, 245*b*, 246, or 247). In other embodiments, the power analytics module 240 may also identify and delete obsolete or redundant files associated with previously replaced or obsolete drivers, and track power consumed during installation or updating of such drivers. In still other embodiments, the power analytics module 240 may further determine power consumed during updates made to various software applications executing via the processor 242 (e.g., CPU, GPU, or VPU).

As described above, the power analytics module 240 may be in communication with a client device CO2 emission tracking system 250, which may also be in communication with an application analytics module 230. In an embodiment, the application analytics module 230 may monitor and adjust execution of software applications within the operating system (OS) for the first client information handling system 200. The application analytics module 230 in an embodiment may further track which software applications are running or idle (e.g., executing in the background) at various times, and track current versions of software applications and times at which updates to such software applications are performed. As described herein, software applications may be associated with indirect emission of GHGs, such as CO2, based on usage of processing, memory, networking, and display resources, either locally at the client information handling system 200, or via a cloud-based server or system 260. The application analytics module 230 in an embodiment may be in communication with any cloud-based server/systems 260 in order to determine a volume of data stored at a remote memory for such server/systems 260, or a number of calls made to a remote processor for such server/systems 260.

The application analytics module 230 in another example may determine current usage of local or remote processing resources as a percentage of total capacity for local processor 242 or a cloud-based processor due to each of a plurality of executing software applications. In yet another example, the application analytics module 230 may determine current usage of local or remote memory resources as a percentage of total capacity for local memory 246 or cloud-based memory repositories due to each of a plurality of executing software applications. In still another example, the application analytics module 230 may determine current usage of network interface device resources as a percentage of total throughput for the network interface device 220 due to each of a plurality of executing software applications. As still another example, the application analytics module 230 may determine current usage of display resources as a percentage of active display time used in displaying a GUI for each of a plurality of executing software applications. Information gathered by the application analytics module 230 in such an embodiment may be communicated to the client device CO2 emission tracking system 250.

As described herein, the client device CO2 emission tracking system 250 in an embodiment may gather data regarding hardware configuration and power consumption from the power analytics module 240 and data regarding software performance and processor/memory usage from the application analytics module 230 during routine monitoring periods. For example, such a monitoring period may be set to occur at a frequency having a default value (e.g., one hour, one day, one week), or may be set by the user of the first client information handling system 200 via the graphical user interface (GUI) 290. The client device CO2 emissions tracking system 250 in an embodiment may determine CO2 emissions generated due to software application usage and power usage at the client information handling system 200 for each of such monitoring periods, as described in greater detail below with respect to FIG. 4. In addition, the client device CO2 emissions tracking system 250 in an embodiment may further compare CO2 emissions generated due to software application usage and power usage at the client information handling system 200 during a current monitoring period against such emissions determined for a previous monitoring period, as described in greater detail below with respect to FIG. 5.

The UEM platform 280 in an embodiment may include a sustainability engine 281, telemetry storage 282, and a CO2 optimization engine 285. The sustainability engine 281 in an embodiment may operate to routinely gather telemetries from CO2 emission tracking systems (e.g., 250 and 271) operating at a plurality of information handling systems (e.g., 200, and 270, respectively). Each telemetry thus received in an embodiment may be stored in telemetry 282 for later analysis by the client device CO2 emission tracking system 280. The CO2 optimization engine 285 in an embodiment may also store information such as an equivalent CO2 emissions value determined at one or more client information handling systems (e.g., 200) resulting from usage of software applications, or known statistics for GHG emissions due to power consumption in the measured location of a client information handling system (e.g., 200). Upon receipt of the telemetry identifying the location of the first client information handling system 200 in an embodiment, the sustainability engine 281 may retrieve a distributed power CO2 emissions value for the geographic location of the first client information handling system during the current monitoring period from the CO2 optimization engine 285. In some embodiments in which the first client information handling system 200 is operating on battery power during some or all of a given monitoring period, the sustainability engine 281 may retrieve a distributed power CO2 emissions value for the geographic location in which the first client information handling system charged the battery most recently, which may have occurred partially or wholly outside of the current monitoring period. Such a distributed power CO2 emissions value may describe the amount of GHG emitted during the generation of a single unit of power (e.g., one kWh) by a power plant known to supply power within the geographic region including the location of the first information handling system 200. The sustainability engine 281 in an embodiment may transmit this distributed power CO2 emissions value for the geographic location of the first information handling system 200 to the client device CO2 emission tracking system 250.

The client device CO2 emissions tracking system 250 in an embodiment may determine a current power CO2 emissions value describing the CO2 emitted during generation of power consumed by various hardware components (e.g., 220, 242, 243, 245*a*, 245*b*, 246, or 247) during the current monitoring period, based on power consumption tracked by the power analytics module 240 and upon the distributed power CO2 emissions value received from the sustainability engine 281. For example, the client device CO2 emissions tracking system 250 may determine a current power CO2 emissions value of 1.02 pounds of CO2 for the entire first client information handling system 200 by multiplying a total power consumed (e.g., 50 watts) by all hardware components (e.g., 220, 242, 243, 245*a*, 245*b*, 246, or 247) of the first client information handling system 200 over the monitoring period by the duration of the monitoring period (e.g., 24 hours) and by the distributed power CO2 emissions value (e.g., 0.85 pounds CO2/kWh). This value may represent an example value for a monitoring period of the carbon footprint for a client information handling system 200 or 270. In other embodiments, the client device CO2 emissions tracking system 250 may determine a current power CO2 emissions value on a component-by-component basis. For example, the client device CO2 emissions tracking system 250 may determine a current power CO2 emissions value of 0.204 pounds of CO2 for the memory 246 of the first client information handling system 200 by multiplying power consumed (e.g., 10 watts) by the memory 246 over the monitoring period by the duration of the monitoring period (e.g., 24 hours) and by the distributed power CO2 emissions value (e.g., 0.85 pounds CO2/kWh). This may be another way of determining the carbon footprint for a client information handling system 200 or 270 for a monitoring period.

As described herein, software application usage may result in indirect emissions of GHGs, that may be measured as an equivalent CO2 emission. For example, software applications may make calls to a local processor 242 (or a remote processor at cloud server/system 260) which may eventually be replaced due to the age and workload of handling all of these calls. As another example, software applications may store data at a local memory 246 (or a remote memory at cloud server/system 260) which may eventually be replaced due to the age and workload of storing all this data. In still another example, software applications may display information via a GUI at the display 245*a*, or transceive data via the network interface device 220, each of which may eventually be replaced due to age and such activities. Such hardware replacement at end of life of a hardware component or due to a need for expanded or reduced capabilities may be associated with GHGs emitted during the manufacture and transport of the replacement processor or memory. As another example, software applications may transmit data through the internet, using hardware portions of an infrastructure of a connected network which may similarly need eventual replacement.

Consequently, the GHG emissions associated with execution of a given software application in an embodiment may be directly proportional to the percentage of hardware component resources consumed during such execution. In other words, software applications are also tracked according to embodiments herein for their portion or percentage of the carbon footprint for a client information handling system 200 or 270 during a monitoring period. The CO2 emission tracking system 250 determines application CO2 emissions and may relate a portion of its contribution to the carbon footprint or power CO2 emissions values for the client information handling system 200 or 270. For example, a software application may utilize a proportion of total network interface device resources, processing resources, memory resources, or display resources. The CO2 emission tracking system 250 in an embodiment may also determine an application CO2 emissions value for a given software application by multiplying one or more of these power CO2 emissions values for a specific hardware component by the percentage of hardware component resources consumed during execution of a software application. For example, in an embodiment in which a gaming software application is consuming 90% of GPU resources, 90% of display resources, 25% of network interface device resources, and 10% of memory resources, the CO2 emission tracking system 250 may determine an application CO2 emissions value for the gaming application specifically by summing 90% of the power CO2 emissions value for the GPU, 90% of the power CO2 emissions value for the display, 25% of the power CO2 emissions value for the network interface device, and 10% of the power CO2 emissions value for the memory. This is only one example of determination of an application CO2 emissions value. Other software applications may be associated with different proportions of hardware component resource consumption, or with resource consumption at other hardware components.

The CO2 emission tracking system 250 in an embodiment may also break down application CO2 emissions values for a given software application by hardware component. For example, the CO2 emission tracking system 250 may determine a local processing application CO2 emissions value for a gaming software application consuming 90% of GPU (e.g., 242) resources by multiplying the power CO2 emissions value for the GPU (e.g., 242) by 90%. As another example, the CO2 emission tracking system 250 may determine a local display application CO2 emissions value for a gaming software application consuming 90% of GPU (e.g., 242) resources by multiplying the power CO2 emissions value for the display (e.g., 245*a*) by 90%. In yet another example, the CO2 emission tracking system 250 may determine a local networking application CO2 emissions value for a gaming software application consuming 25% of network interface device (e.g., 220) resources by multiplying the power CO2 emissions value for the network interface device (e.g., 220) by 25%. In still another example, the CO2 emission tracking system 250 may determine a local memory application CO2 emissions value for a gaming software application consuming 10% of memory (e.g., 246) resources by multiplying the power CO2 emissions value for the memory (e.g., 246) by 10%.

Many software application providers also provide general estimates of the GHG emissions associated with the use of their products. The CO2 emission tracking system 250, or the enterprise management system 205 in an embodiment may communicate with one or more of these providers and with one another to gather such general estimates as equivalent CO2 emissions (eCO2) associated with each minute of use for such an application. In another example, some providers break down these eCO2 emissions estimates according to functionality and use of various aspects of those software applications. More specifically, a cloud-based application may show eCO2 emissions associated with application tasks executed locally (e.g., at the client information handling system), and eCO2 emissions associated with application tasks executed remotely (e.g., in the cloud). One example software application that provides such in-depth tracking of eCO2 emissions includes Microsoft's® Emissions Impact Dashboard® for Azure® or for Office 365 ®. In some embodiments, one or more of these eCO2 emissions estimators may be operating as an agent at the client information handling system (e.g., 200). These eCO2 emissions may be used to determine application benchmark CO2 emissions values in an embodiment.

As described above and with respect to FIG. 5, below, the CO2 emission tracking system 250 may determine an application CO2 emissions value for one or more software applications based on the percentage of hardware component resources consumed during execution of that software application and upon the power CO2 emissions value for each hardware component. In this way, the CO2 emission tracking system 250 determines and may report the portion of given software applications attributable to the carbon footprint for a client information handling system 200 or 270 during a monitoring period which is useful in determining an underperforming software application or hardware unable to support such an application. This may yield recommendations for changes or alterations to the software applications or hardware for the client information handling system 200 or 270. Thus, the application CO2 emissions value determined in such a way may be based on concrete measurements of actual execution statistics at the first information handling system 200. The comparison benchmark CO2 emissions value, in contrast, may represent estimated statistics for such executions, or projected performance of such software applications in an ideal operating environment. In other words, these comparison benchmark CO2 emissions value may be valuable as a benchmark for comparison against more concrete application CO2 emissions values to identify when a software application is underperforming or behaving aberrantly, causing high power consumption and increased CO2 emissions.

The CO2 emission tracking system 250 in an embodiment may receive these eCO2 emission estimates from an agent, from the enterprise management system 205, or from the application analytics module 230 in communication with one or more of the eCO2 emissions estimator agents described directly above. For example, the CO2 emission tracking system 250 may receive an overall application eCO2 emissions estimate describing an estimated eCO2 emitted due to operation of a specific software application over a preset time interval (e.g., one minute). This preset time interval in an embodiment may describe a small, measured unit of time over which an application emits GHGs. The monitoring period provided by the user or set to a default, as described above, may be set to a different value than the preset time interval in various embodiments. For example, the preset time interval may be one minute, while the monitoring period may be set to one day. The preset time interval described here may set the time units in which a known eCO2 emission may occur due to operation of a software application, while the monitoring period may dictate the frequency with which CO2 emissions due to such operation of the software application are determined, based on the number of time units in the monitoring period in which the software application was active.

In another example, the CO2 emission tracking system 250 may receive a local processing application eCO2 emissions estimate describing an estimated eCO2 emitted due to each call to a local CPU 242 made during operation of a specific software application. As another example, the CO2 emission tracking system 250 may receive a local memory application eCO2 emissions estimate describing an estimated eCO2 emitted due to each byte of data stored to a local memory 246 made during operation of a specific software application. In another example, the CO2 emission tracking system 250 may receive networking application eCO2 emissions estimate describing an estimated eCO2 emitted due to transceiving of each byte of data via the network interface device 220 during operation of a specific software application. In still another example, the CO2 emission tracking system 250 may receive a display eCO2 emission estimate describing an estimated eCO2 emitted due to display of a software application GUI via the display 245a as a percentage of the full scope of the display. As still another example, the CO2 emission tracking system 250 may receive an internet eCO2 emission estimate describing an estimated eCO2 emitted due to each web engine search or web page visited during operation of a specific software application (e.g., Google Chrome®).

In still another example, the CO2 emission tracking system 250 may receive a remote processing application eCO2 emissions estimate describing an estimated eCO2 emitted due to each call to a remote processor of the cloud server/system 260 made during operation of a specific software application. As another example, the CO2 emission tracking system 250 may receive a remote memory application eCO2 emissions estimate describing an estimated eCO2 emitted due to each byte of data stored to a remote memory of the cloud server/system 260 made during operation of a specific software application.

The CO2 emission tracking system 250 in an embodiment may combine these received application eCO2 emission estimates with analytics describing software application usage at the first client information handling system 200, specifically, to determine a comparison benchmark CO2 emissions value for one or more software applications over a monitoring period, such as one day. For example, the CO2 emission tracking system 250 may multiply a received application eCO2 emissions estimate due to operation of a specific software application (e.g., gaming application) over a preset time period (e.g., one minute) by the number of those time periods (e.g., minutes) such a specific software application was executing at the first information handling system 200 over the monitoring period (e.g., one day). As another example, the CO2 emission tracking system 250 may multiply a received local processing application eCO2 emissions estimated due to each call to a local CPU 242 made during operation of a specific software application by the number of those calls made by such a specific software application at the first information handling system 200 over the monitoring period (e.g., one day) to determine a local processing application benchmark CO2 emissions value. In still another example, the CO2 emission tracking system 250 may multiply a received local memory application eCO2 emissions estimated due to each byte of data stored to a local memory 246 during operation of a specific software application by the number of those bytes stored pursuant to execution of such a specific software application at the first information handling system 200 over the monitoring period (e.g., one day) to determine a local memory application benchmark CO2 emissions value.

In yet another example, the CO2 emission tracking system 250 may multiply a received networking application eCO2 emissions estimate due to transceiving of each byte of data via the network interface device 220 during operation of a specific software application by the number of those bytes transceived during execution of such a specific software application at the first information handling system 200 over the monitoring period (e.g., one day) to determine a networking application benchmark CO2 emissions value. As yet another example, the CO2 emission tracking system 250 may multiply a received display application eCO2 emissions estimate due to display of information via the display 245*a* of content (e.g., via a GUI) for a number of preset intervals of time during operation of a specific software application by the duration of such display during execution of such a specific software application at the first information handling system 200 over the monitoring period (e.g., one day) to determine a display application benchmark CO2 emissions value.

As described herein, the application CO2 emissions values determined by the CO2 emission tracking system 250 in an embodiment based on the power CO2 emissions value may provide a more accurate representation of CO2 emitted during execution of software applications consuming local resources (e.g., network interface device 220, processor 242, memory 246, display 245*a*). In addition to these application CO2 emissions values due to consumption of local resources, various software applications may also be associated with remote application CO2 emissions values caused by consumption of resources for remote hardware components (e.g., storage in remote memory, remote processing at cloud-based servers, usage of network infrastructure). The CO2 emission tracking system 250 in an embodiment may rely on the eCO2 emission estimates received from an agent, from the enterprise management system 205, or from the application analytics module 230 in communication with one or more of the eCO2 emissions estimator agents to determine these remote application CO2 emissions values.

For example, the CO2 emission tracking system 250 may multiply a received remote processing application eCO2 emissions estimated due to each call to a remote processor of the cloud server/system 260 made during operation of a specific software application by the number of those calls made by execution of such a specific software application at the first information handling system 200 over the monitoring period (e.g., one day) to determine a remote processing application CO2 emissions value. In still another example, the CO2 emission tracking system 250 may multiply a received remote memory application eCO2 emissions estimated due to each byte of data stored to a remote memory of the cloud server/system 260 during operation of a specific software application by the number of those bytes stored pursuant to execution of such a specific software application at the first information handling system 200 over the monitoring period (e.g., one day) to determine a remote memory application CO2 emissions value. In still another example, the CO2 emission tracking system 250 may multiply a received internet application eCO2 emissions estimate due to each web engine search or web page visited during operation of a specific software application (e.g., Google Chrome®) by the number of such searches or web pages visited during execution of such a specific software application at the first information handling system 200 over the monitoring period (e.g., one day) to determine a remote internet application CO2 emissions value.

The client device CO2 emission tracking system 250 may gather the information received from the power analytics module 240 and the application analytics module 230 and any determined application CO2 emissions values (e.g., as determined based on portions of power CO2 emissions value by the CO2 emissions tracking system 250, application benchmark CO2 emissions value determined based on estimated CO2 emissions, or remote application CO2 emissions values) into a telemetry for the current monitoring period and transmit that telemetry to the UEM platform 280. The telemetry may thus include a geographic location for the first client information handling system 200, determined application CO2 emissions values, such as portions of power CO2 emissions values for local hardware components, estimated CO2 emissions values used as a benchmark comparison against application CO2 emissions values, remote application CO2 emissions values, and software application analytics and hardware power consumption analytics for the first client information handling system 200. A CO2 emission tracking system 271 operating at a second client information handling system 270 may also transmit similar telemetries, indicating software application usage and power usage at the second information handling system 270. The UEM platform 280 in an embodiment may routinely gather such telemetries from the first client information handling system 200 and a plurality of other client information handling systems (e.g., 270), for storage at telemetry 282. As a consequence, the telemetry 282 may store current application CO2 emissions values (e.g., as determined based portions of on current power CO2 emissions values), as well as previous application CO2 emissions values, determined based on past application and power analytics (e.g., from the previous day, week, month, etc.).

The telemetry 282 may also store similar current and previous application CO2 emissions values from a plurality of other client information handling systems (e.g., 270) in an embodiment. In some embodiments, the sustainability engine 281 may determine an average application CO2 emissions value for a given monitoring period by taking the average of all application CO2 emissions values most recently gathered across all client information handling systems (e.g., 200 and 270), for comparison. Such a comparison in an embodiment may be useful in identifying when application CO2 emissions values at a given information handling system (e.g., 200) are out of the norm, which may indicate an adjustment to software usage may be appropriate. The sustainability engine 281 may routinely report such previous application CO2 emissions values for a specific information handling system (e.g., 200), or average application CO2 emissions for the most recent monitoring period across a plurality of client information handling systems (e.g., 200 or 270) to the CO2 emission tracking system 250 in an embodiment.

The client device CO2 emission tracking system 250 for the first client information handling system 200 and the client device CO2 emission tracking system 271 at the second client information handling system 270 may transmit determined current power CO2 emissions values and current application CO2 emissions values for the most recent or current monitoring period to the sustainability engine 281 for storage in telemetry 282. As described in greater detail below with respect to FIG. 5 and directly below, the client device CO2 emission tracking system 250 may routinely receive current application benchmark CO2 emissions values for the first information handling system 200, previous application CO2 emissions values for the first information handling system 200 or average application CO2 emissions values for a plurality of information handling systems including 271 for comparison with the current application CO2 emissions values. Such comparisons in an embodiment may be useful in identifying when application CO2 emissions values at a given information handling system (e.g., 200) are out of the norm, which may indicate an adjustment to software usage may be appropriate. For example, the client device CO2 emission tracking system in an embodiment may subtract the current application CO2 emissions value from the current application benchmark CO2 emissions value to determine whether the current value determined based on actual power consumption at the information handling system 200 is significantly higher than the estimated value for execution of the software application in an ideal operating environment. As another example, the client device CO2 emission tracking system in an embodiment may subtract the current application CO2 emissions value from the previous application CO2 emissions value to determine whether the current value is significantly higher than the previous value. In another example, the client device CO2 emission tracking system in an embodiment may subtract the current application CO2 emissions value from the average application CO2 emissions value to determine whether the current value is significantly higher than the average value across a plurality of other information handling systems. A deviation threshold may be utilized to determine whether the current value is significantly greater than the average or estimated values in various embodiments.

In another aspect of an embodiment, such comparisons may be made on a component-by-component basis. For example, the client device CO2 emission tracking system in an embodiment may subtract the current application processing benchmark CO2 emissions value from the current application processing CO2 emissions value to determine whether the current value attributable to actual consumption of resources at the processor 242 is significantly higher than the estimated value associated with optimal or ideal usage of the processor 242. As another example, the client device CO2 emission tracking system in an embodiment may subtract the current application memory benchmark CO2 emissions value from the current application memory CO2 emissions value to determine whether the current value attributable to actual consumption of resources at the memory 246 is significantly higher than the estimated value associated with optimal or ideal usage of the memory 246. In yet another example, the client device CO2 emission tracking system in an embodiment may subtract the current application networking benchmark CO2 emissions value from the current application networking CO2 emissions value to determine whether the current value attributable to actual consumption of resources at the network interface device 220 is significantly higher than the estimated value associated with optimal or ideal usage of the network interface device 220. In still another example, the client device CO2 emission tracking system in an embodiment may subtract the current application display benchmark CO2 emissions value from the current application display CO2 emissions value to determine whether the current value attributable to actual consumption of resources at the display 245a is significantly higher than the estimated value associated with optimal or ideal usage of the display 245a. Again, a deviation threshold may be utilized to determine whether the current value is significantly greater than the average or estimated values in various embodiments.

In another example, the client device CO2 emission tracking system in an embodiment may subtract the current application processing CO2 emissions value from the previous application processing CO2 emissions value to determine whether the current value attributable to consumption of resources at the processor 242 is significantly higher than the previous value. As another example, the client device CO2 emission tracking system in an embodiment may subtract the current application memory CO2 emissions value from the previous application memory CO2 emissions value to determine whether the current value attributable to consumption of resources at the memory 246 is significantly higher, subject to a deviation threshold amount, than the previous value. In yet another example, the client device CO2 emission tracking system in an embodiment may subtract the current application networking CO2 emissions value from the previous application networking CO2 emissions value to determine whether the current value attributable to consumption of resources at the network interface device 220 is significantly higher than the previous value. In still another example, the client device CO2 emission tracking system in an embodiment may subtract the current application display CO2 emissions value from the previous application display CO2 emissions value to determine whether the current value attributable to consumption of resources at the display 245a is significantly higher, subject to a deviation threshold amount, than the previous value.

In yet another example, the client device CO2 emission tracking system in an embodiment may subtract the current application processing CO2 emissions value from the average application processing CO2 emissions value to determine whether the current value attributable to consumption of resources at the processor 242 is significantly higher than the average value. As another example, the client device CO2 emission tracking system in an embodiment may subtract the current application memory CO2 emissions value from the average application memory CO2 emissions value to determine whether the current value attributable to consumption of resources at the memory 246 is significantly higher than the average value. In yet another example, the client device CO2 emission tracking system in an embodiment may subtract the current application networking CO2 emissions value from the average application networking CO2 emissions value to determine whether the current value attributable to consumption of resources at the network interface device 220 is significantly higher than the average value. In still another example, the client device CO2 emission tracking system in an embodiment may subtract the current application display CO2 emissions value from the average application display CO2 emissions value to determine whether the average value attributable to consumption of resources at the display 245a is significantly higher than the average value. Again, a deviation threshold may be utilized to determine whether the current value is significantly greater than the average or estimated values in various embodiments.

The significance in difference between the current application CO2 emissions value(s) and the current application benchmark CO2 emissions value(s), the previous application CO2 emissions value(s), or the average application CO2 emissions value(s) (determined as described directly above) may be gauged according to a preset usage warning threshold value. Such a preset usage warning threshold value may be used to identify unexpected spikes in resource usage by one or more software applications in an embodiment. For example, the preset warning threshold may be when a current application CO2 emissions value exceeds a deviation threshold in an embodiment. The preset usage warning threshold value in an embodiment may apply to the overall current application CO2 emissions value (e.g., not segregated by specific applications), or may apply on an application-by-application basis. For example, the preset usage warning threshold value may be set to 20%, indicating that an adjustment to the usage of software applications may be appropriate when the current application CO2 emissions value differs from the previous application CO2 emissions value by 20% or more. This is only one example of a preset usage warning threshold value, and any other factors or percentages are also contemplated. This may be used to identify one or more problematic software applications in an embodiment.

The client device CO2 emissions tracking system 250 in another embodiment may identify one or more problematic software applications generating an unnecessarily high CO2 emission by comparing these current resource usage measurements against the preset maximum resource threshold values described above. For example, if a gaming software application is currently consuming more than 85% of the resources for the processor 242 (e.g., GPU), the client device CO2 emissions tracking system 250 in an embodiment may identify the gaming application as a problematic software application. As another example, if a streaming video application is currently consuming more than 85% of the resources for the memory 246, the client device CO2 emissions tracking system 250 in an embodiment may identify the streaming video application as a problematic software application. In yet another example, if a video conferencing software application is currently consuming more than 85% of the resources for the network interface device 220, the client device CO2 emissions tracking system 250 in an embodiment may identify the video conferencing software application as a problematic software application. In still another example, if a streaming video application is currently consuming more than 85% of the resources for the display 245a, the client device CO2 emissions tracking system 250 in an embodiment may identify the streaming video application as a problematic software application.

The GUI 290 in an embodiment may display a recommendation to terminate the problematic software application or to limit hardware or network resources made available during execution of the problematic software application. For example, the GUI 290 may display a recommendation to terminate any background applications identified as problematic software applications. As another example, the GUI 290 in an embodiment in which the client device CO2 emissions tracking system 250 identified the gaming application as a problematic software application for consuming more than 85% of the processor resources may recommend limiting the gaming application's access to processor resources to 85%. In yet another example, the GUI 290 in an embodiment in which the client device CO2 emissions tracking system 250 identified the streaming video application as a problematic software application for consuming more than 85% of the memory resources may recommend limiting the streaming video application's access to memory resources to 85%. As yet another example, the GUI 290 in an embodiment in which the client device CO2 emissions tracking system 250 identified the videoconferencing software application as a problematic software application for consuming more than 85% of the network interface device resources may recommend limiting the videoconferencing software application's access to processor resources to 85%. In still another example, the GUI 290 in an embodiment in which the client device CO2 emissions tracking system 250 identified the streaming video application as a problematic software application for consuming more than 85% of the display resources may recommend limiting the streaming video application's access to display resources to 85%.

Figure 3:
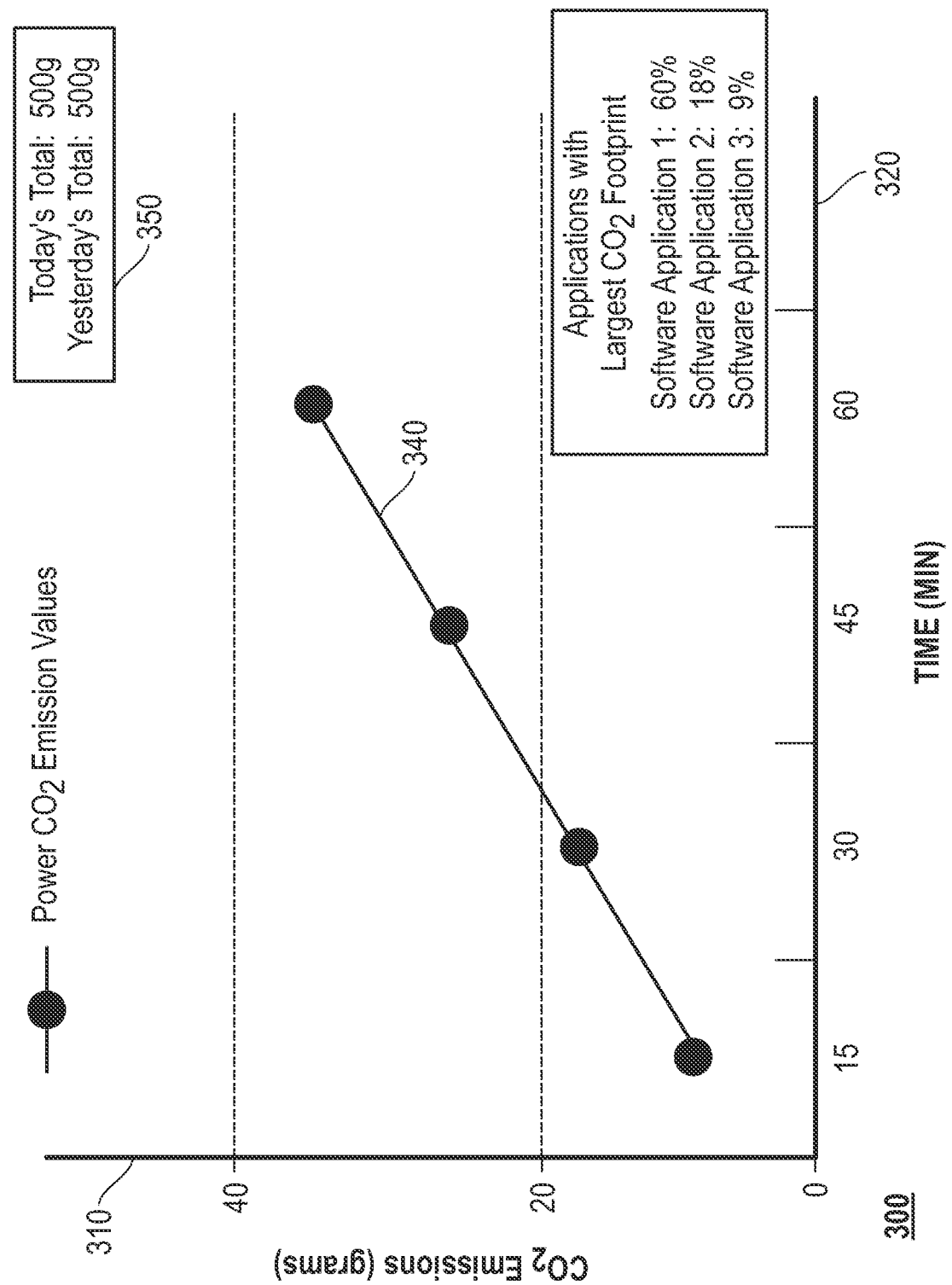
FIG. 3 is a graphical diagram illustrating a graphical user interface (GUI) displaying an application CO2 emissions value according to an embodiment of the present disclosure.

FIG. 3 is a graphical diagram illustrating a graphical user interface (GUI) displaying a power CO2 emissions value over a monitoring period according to an embodiment of the present disclosure. As described herein, the client device CO2 emissions tracking system in an embodiment may determine current power CO2 emissions values describing CO2 emissions associated with consumption of power by an information handling system over a preset monitoring period. A graphical user interface (GUI) 300 of the information handling system may then display such determined power CO2 emission values 340 over time, as they are determined for each monitoring period (e.g., every 15 minutes). Such determined power CO2 emissions values 340 may be plotted, for example, against a CO2 emissions axis 310 and a time axis 320.

Further, the GUI 300 may display application CO2 emissions values 330 represented as a portion of the total carbon footprint of a client information handling system when operating with one or more software applications. In an embodiment, the application CO2 emissions values 330 may show a percentage of the carbon footprint of the client information handling system itemized by one or more operating software applications executing on the client information handling system. The reporting of the application CO2 emissions values 330 may be over one monitoring period or may be accumulated over several monitoring periods as shown in FIG. 3. In the shown example, a first software application may consume 60% of the total carbon footprint over one or more monitoring periods, while a second application consumes 18%, and a third application consumes 9%. For example, the first application may be a videoconferencing application that is being used and not necessarily performing efficiently on the client information handling system. The second and third applications may be operating as expected. Further, not all applications are necessarily reported in the GUI 300 either. For example, software applications that consume less than some portion of the carbon footprint, for example less than 3%, may not be reported in some embodiments.

In some embodiments, the GUI 300 may display a total combined CO2 emissions (e.g., 500g) value 320 for a given day, determined by combining all power CO2 emissions values across all monitoring periods for a 24 hour period. The GUI 300 may also display such a total combined CO2 emissions value 350 for previous days, weeks, months, etc. In other embodiments, the GUI 300 may further provide combined power CO2 emissions values over time 350 (e.g., similar to 340) that are specifically attributable to one or more software applications (e.g., gaming application, videoconferencing application, video streaming application).

Figure 4:
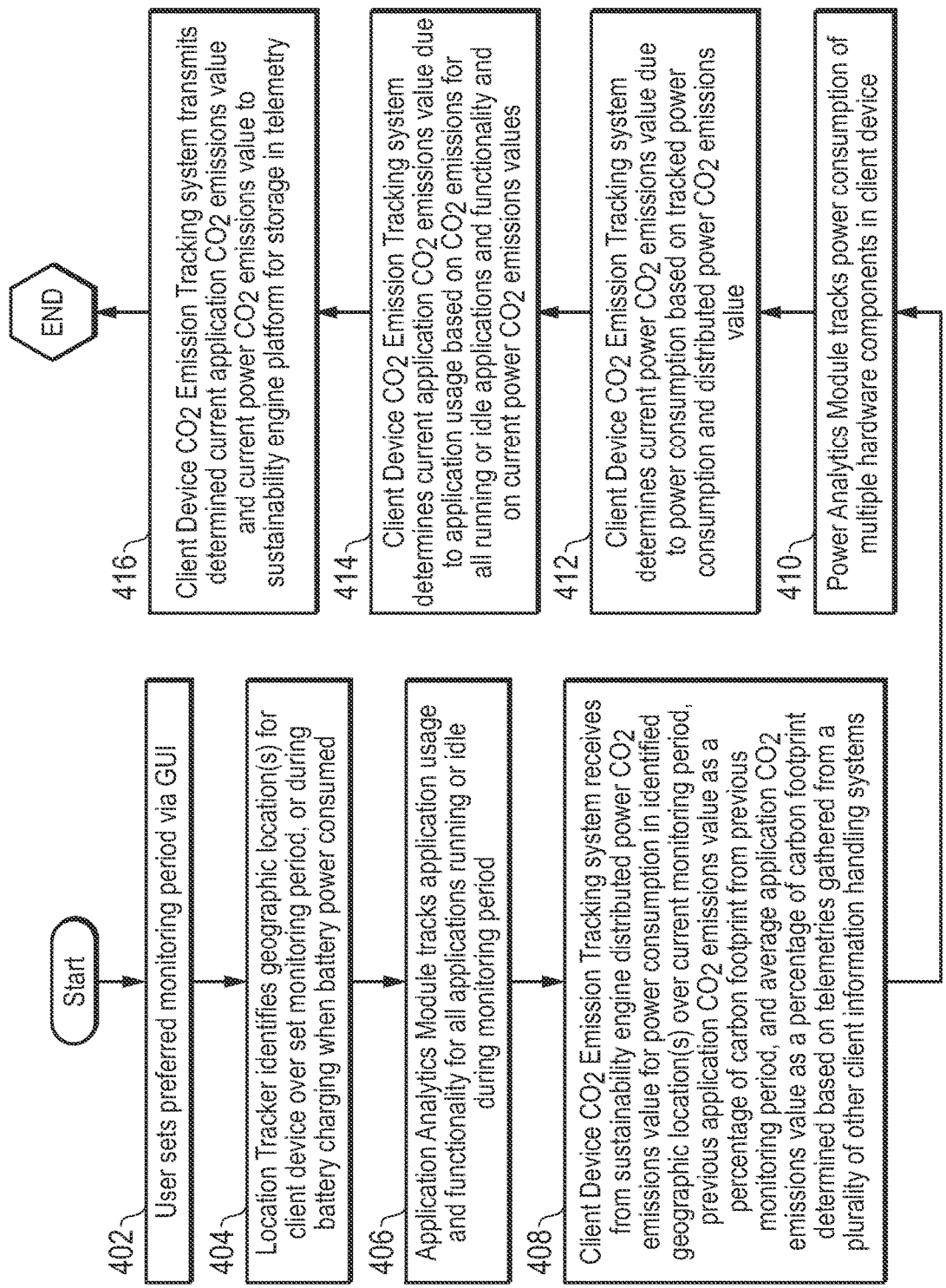
FIG. 4 is a flow diagram illustrating a method of determining an application CO2 emissions value for a client information handling system according to an embodiment of the present disclosure.

FIG. 4 is a flow diagram illustrating a method of determining a current application carbon dioxide (CO2) emissions value as a percentage of a total carbon footprint for a client information handling system as determined from a current power CO2 emissions value for a client information handling system during a current monitoring period according to an embodiment of the present disclosure. As described herein, the client device CO2 emission tracking system in an embodiment may determine an amount of greenhouse gas emissions that may be attributable to usage at an information handling system of software applications and power.

At block 402, a user of the client information handling system in an embodiment may set a preferred monitoring period for tracking CO2 emissions due to use of applications and power at the information handling system. For example, in an embodiment described with reference to FIG. 2, the client device CO2 emission tracking system 250 in an embodiment may gather data regarding hardware configuration and power consumption from the power analytics module 240 and data regarding software performance and processor/memory usage from the application analytics module 230 at preset intervals. For example, such a preset interval may be set to a default monitoring period value (e.g., one hour, one day, one week), or may be set by the user of the first client information handling system 200 via the graphical user interface (GUI) 290.

A location tracking in an embodiment may identify a geographic location for the client information handling system over the user-specified monitoring period at block 404. For example, the location sensor 243 in an embodiment may determine a geographic location (e.g., zip code, GPS coordinates, city, state, country) in which the first client information handling system 200 is operating. The CO2 emissions tracking system 250 in an embodiment may gather such geographic location information during a current monitoring period for determination of a carbon footprint associated with power consumption at that location during the current monitoring period. In some embodiments in which the first client information handling system 200 is operating on battery power during some or all of a given monitoring period, the geographic location in which the first client information handling system charged the battery most recently may also be recorded. This most recent charging in an embodiment may have occurred partially or wholly outside of the current monitoring period. As described herein, the GHGs emitted due to consumption of power in an embodiment may vary based on such a geographic location due to variance in GHG emissions by power suppliers in various geographic locations and the fuel used to generate such power.

At block 406, an application analytics module may track application usage and functionality for a plurality of software applications running or idle during the monitoring period. For example, in an embodiment described with reference to FIG. 2, the application analytics module 230 may track which software applications are running or idle (e.g., executing in the background) at various times, and track current versions of software applications and times at which updates to such software applications are performed. In still another example, the application analytics module 230 may determine current usage of local or remote processing resources as a percentage of total capacity for local processor 242 or a cloud-based processor due to each of a plurality of executing software applications. In yet another example, the application analytics module 230 may determine current usage of local or remote memory resources as a percentage of total capacity for local memory 246 or cloud-based memory repositories due to each of a plurality of executing software applications. In still another example, the application analytics module 230 may determine current usage of network interface device resources as a percentage of total throughput for the network interface device 220 due to each of a plurality of executing software applications. As still another example, the application analytics module 230 may determine current usage of display resources as a percentage of active display time used in displaying a GUI for each of a plurality of executing software applications. Information gathered by the application analytics module 230 in such an embodiment may be communicated to the client device CO2 emission tracking system 250.

As described herein, software application usage may result in direct or indirect emissions of GHGs, that may be measured as an equivalent CO2 emission. Many software application providers provide general estimates of the GHG emissions associated with the use of their products. The CO2 emission tracking system 250, or the enterprise management system 205 in an embodiment may communicate with one or more of these providers and with one another to gather such general estimates as equivalent CO2 emissions (eCO2) associated with each minute of use for such an application. For example, the CO2 emission tracking system 250 may receive an overall application eCO2 emissions estimate describing an estimated eCO2 emitted due to operation of a specific software application over a preset time interval (e.g., one minute). More specifically, in one example embodiment, the CO2 emission tracking system 250 may receive a local processing application eCO2 emissions estimate describing an estimated eCO2 emitted due to each call to a local CPU 242 made during operation of a specific software application. As another example, the CO2 emission tracking system 250 may receive a local memory application eCO2 emissions estimate describing an estimated eCO2 emitted due to each byte of data stored to a local memory 246 made during operation of a specific software application. In another example, the CO2 emission tracking system 250 may receive networking application eCO2 emissions estimate describing an estimated eCO2 emitted due to transceiving of each byte of data via the network interface device 220 during operation of a specific software application. In still another example, the CO2 emission tracking system 250 may receive a display eCO2 emission estimate describing an estimated eCO2 emitted due to display of a software application GUI via the display 245a as a percentage of the full scope of the display. As still another example, the CO2 emission tracking system 250 may receive an internet eCO2 emission estimate describing an estimated eCO2 emitted due to each web engine search or web page visited during operation of a specific software application (e.g., Google Chrome®).

These eCO2 emissions may be used to determine application benchmark CO2 emissions values in an embodiment. As described above and with respect to block 414, below, the CO2 emission tracking system 250 may determine an application CO2 emissions value for one or more software applications based on the percentage of one or more hardware component resources consumed during execution of that software application and on the power CO2 emissions value for each hardware component. Thus, the application CO2 emissions value determined in such a way may be based on concrete measurements of actual execution statistics at the first information handling system 200. In this way, the application CO2 emissions value may be determined as a portion of the carbon footprint from the power CO2 emissions values over one or more monitoring periods for the first information handling system. The comparison benchmark CO2 emissions value, in contrast, may represent estimated statistics for such executions, or projected performance of such software applications in an ideal operating environment. In other words, these comparison benchmark CO2 emissions value may be valuable as a benchmark for comparison against more concrete application CO2 emissions values to further identify when a software application is underperforming or behaving aberrantly, causing high power consumption and increased CO2 emissions.

The CO2 emission tracking system 250 may also receive estimated or eCO2 emissions associated with consumption of remote hardware resources, such as cloud-computing processing, memory, or network infrastructure components. Where remote resources are concerned, the CO2 emission tracking system 250 may rely on received estimated CO2 emissions, rather than on the determined power CO2 emissions values, due to lack of data describing power consumed at those remote resource locations. In other embodiments, remote hardware resource consumption data may be reported to the CO2 emission tracking system 250 at one or any client information handling system as attributable to activity of that client information handling system when such data is made available. In one example embodiment, the CO2 emission tracking system 250 may receive a remote processing application eCO2 emissions estimate describing an estimated eCO2 emitted due to each call to a remote processor of the cloud server/system 260 made during operation of a specific software application. As another example, the CO2 emission tracking system 250 may receive a remote memory application eCO2 emissions estimate describing an estimated eCO2 emitted due to each byte of data stored to a remote memory of the cloud server/system 260 made during operation of a specific software application. These remote operations and CO2 emissions generated may be added to the current power CO2 levels to provide a total carbon footprint estimate of the client information handling system in embodiments herein that is incorporated with the power CO2 emission values and used in determination of total carbon footprint as well as application CO2 emissions values.

The client device CO2 emission tracking system in an embodiment at block 408 may receive from a sustainability engine a distributed power CO2 emissions value for power consumption in the identified geographic location or power usage or battery charging over the current monitoring period, a previous application CO2 emissions value from a percentage of total carbon footprint of the client information handling system from a previous monitoring period, and an average application CO2 emissions value from a percentage of total carbon footprint of the client information handling system determined based on telemetries gathered from this client information handling system historically, or other client information handling systems. For example, in an embodiment described with reference to FIG. 2, upon receipt of the telemetry identifying the location of the first client information handling system 200 during power consumption or battery charging in an embodiment, the sustainability engine 281 may retrieve a distributed power CO2 emissions value for the geographic location of the first client information handling system from the CO2 optimization engine 285. In some embodiments in which the first client information handling system 200 is operating on battery power during some or all of a given monitoring period, the sustainability engine 281 may retrieve a distributed power CO2 emissions value for the geographic location in which the first client information handling system charged the battery most recently, which may have occurred partially or wholly outside of the current monitoring period. Such a distributed power CO2 emissions value may describe the amount of GHG emitted during the generation of a single unit of power (e.g., one kWh) by a power plant known to supply power within the geographic region including the location of the first information handling system 200 during power consumption or battery charging. The sustainability engine 281 in an embodiment may transmit this distributed power CO2 emissions value for the geographic location of the first information handling system 200 to the client device CO2 emission tracking system 250.

In some embodiments, the sustainability engine 281 may optionally transmit information the client device CO2 emission tracking system may use to compare performance at a first client information handling system to performance historically at the first client information handling system 250, or at other client information handling systems (e.g., 270). For example, telemetry 282 may store current application benchmark CO2 emissions values, current application CO2 emissions values, determined based on application analytics gathered during the current monitoring period (or most recent monitoring period), as well as previous application CO2 emissions values from a percentage of total carbon footprint of the first client information handling system 200, determined based on past application analytics (e.g., from the previous day, week, month, etc.) from a percentage of total carbon footprint of the first client information handling system 200 or other client information handling systems (e.g., 270).

The telemetry 282 may store similar current and previous application CO2 emissions values from a plurality of other client information handling systems (e.g., 270) in an embodiment. In some embodiments, the sustainability engine 281 may determine an average application CO2 emissions value from a percentage of total carbon footprint of the first client information handling system 200 or from other client information handling systems (e.g., 270) for a given monitoring period by taking the average of all application CO2 emissions values most recently gathered across all client information handling systems (e.g., 200 and 270), for comparison. Such a comparison in an embodiment may be useful in identifying when application CO2 emissions values at a given information handling system (e.g., 200) are out of the norm, which may indicate an adjustment to software usage may be appropriate. The sustainability engine 281 may routinely report such previous application CO2 emissions values for a specific information handling system (e.g., 200), or average application CO2 emissions for the most recent monitoring period across a plurality of client information handling systems (e.g., 200 or 270) to the CO2 emission tracking system 250 in an embodiment.

At block 410, the power analytics module may track power consumption of multiple hardware components in the client information handling system in an embodiment. For example, the power analytics module 240 in an embodiment may monitor power consumption by each of the various hardware components (e.g., 220, 242, 243, 245a, 245b, 246, or 247) in an embodiment. In some embodiments, such hardware power consumption may be attributed to specific software applications, based on portions as percentage usage of a software applications of a given hardware component. For example, the power analytics module 240 in an embodiment may determine current usage of processing resources by software applications as a percentage of total capacity for the processor 242 (e.g., central processing unit (CPU), graphics processing unit (GPU), or visual processing unit (VPU)). In still another example, the power analytics module may determine current usage of memory resources by software applications as a percentage of total capacity for memory 246, time required to process requests to access such memory 246, and identify software applications most frequently accessing such memory 246. In yet another example, the power analytics module 240 in an embodiment may determine a current usage of the display by software applications as a percentage of display time in which GUI for a specific software application is visible or displayed, and a usage mode for the display 245a, such as day mode, night mode, power reserve mode, or gaming mode (e.g., high-resolution). In another example, the power analytics module 240 in an embodiment may determine current usage of network interface device resources by software applications as a percentage of total capacity for the network interface device 220 to transceive data (e.g., percentage of total available throughput used). All information accessed in such a way by the power analytics module 240 in an embodiment may be communicated to the CO2 emission tracking system 250.

The client device CO2 emission tracking system in an embodiment may determine a current power CO2 emissions value at block 412 due to power consumption based on tracked power consumption and the distributed power CO2 emissions value received at block 408. For example, the client device CO2 emissions tracking system 250 in an embodiment may determine a current power CO2 emissions value describing the CO2 emitted during generation of power consumed by various hardware components (e.g., 220, 242, 243, 245a, 245b, 246, or 247) during the current monitoring period, based on power consumption tracked by the power analytics module 240 and upon the distributed power CO2 emissions value received from the sustainability engine 281. More specifically, the client device CO2 emissions tracking system 250 may determine a current power CO2 emissions value of 1.02 pounds of CO2 for the entire first client information handling system 200 by multiplying a total power consumed (e.g., 50 watts) by all hardware components (e.g., 220, 242, 243, 245a, 245b, 246, or 247) of the first client information handling system 200 over the monitoring period by the duration of the monitoring period (e.g., 24 hours) and by the distributed power CO2 emissions value (e.g., 0.85 pounds CO2/kWh).

At block 414, the client device CO2 emission tracking system in an embodiment may determine the current application CO2 emissions value due to application usage based on CO2 emissions for all running or idle applications and functionality and upon current power CO2 emissions determined at block 412. As described herein, the GHG emissions associated with execution of a given software application in an embodiment may be directly proportional to the percentage of hardware component resources consumed during such execution. The CO2 emission tracking system 250 in an embodiment may determine an application CO2 emissions value for a given software application by multiplying one or more of these power CO2 emissions values for a specific hardware component by the percentage of hardware component resources consumed during execution of a software application. For example, in an embodiment described with reference to FIG. 2, in which a gaming software application is consuming 90% of GPU resources, 90% of display resources, 25% of network interface device resources, and 10% of memory resources, the CO2 emission tracking system 250 may determine an application CO2 emissions value for the gaming application specifically by summing 90% of the power CO2 emissions value for the GPU, 90% of the power CO2 emissions value for the display, 25% of the power CO2 emissions value for the network interface device, and 10% of the power CO2 emissions value for the memory. This is only one example of determination of an application CO2 emissions value. Other software applications may be associated with different proportions of hardware component resource consumption, or with resource consumption at other hardware components.

The CO2 emission tracking system 250 in an embodiment may also break down application CO2 emissions values for a given software application by hardware component. For example, the CO2 emission tracking system 250 may determine a local processing application CO2 emissions value for a gaming software application consuming 90% of GPU (e.g., 242) resources by multiplying the power CO2 emissions value for the GPU (e.g., 242) by 90%. As another example, the CO2 emission tracking system 250 may determine a local display application CO2 emissions value for a gaming software application consuming 90% of GPU (e.g., 242) resources by multiplying the power CO2 emissions value for the display (e.g., 245a) by 90%. In yet another example, the CO2 emission tracking system 250 may determine a local networking application CO2 emissions value for a gaming software application consuming 25% of network interface device (e.g., 220) resources by multiplying the power CO2 emissions value for the network interface device (e.g., 220) by 25%. In still another example, the CO2 emission tracking system 250 may determine a local memory application CO2 emissions value for a gaming software application consuming 10% of memory (e.g., 246) resources by multiplying the power CO2 emissions value for the memory (e.g., 246) by 10%.

As described herein, the application CO2 emissions values determined by the CO2 emission tracking system 250 in an embodiment are based on the power CO2 emissions value for the client information handling system 200 and may provide a more accurate representation of CO2 emitted during execution of software applications consuming local resources (e.g., network interface device 220, processor 242, memory 246, display 245a) than the estimated or eCO2 emissions upon which the current application benchmark CO2 emissions values are based. For example, the CO2 emission tracking system 250 in an embodiment may determine application CO2 emissions values as a portion or percentage of the power CO2 emissions value for the client information handling system to represent a portion of the carbon footprint of the client information handling system attributable to each of one or more executing software applications. In addition to these application CO2 emissions values due to consumption of local resources, various software applications may also be associated with remote application CO2 emissions values caused by consumption of resources for remote hardware components (e.g., storage in remote memory, remote processing at cloud-based servers, usage of network infrastructure) which may be further factored into the portion of carbon footprint determined for a client information handling system. The CO2 emission tracking system 250 in an embodiment may rely on the eCO2 emission estimates received from an agent, from the enterprise management system 205, or from the application analytics module 230 in communication with one or more of the eCO2 emissions estimator agents to determine these remote application CO2 emissions values.

For example, the CO2 emission tracking system 250 may multiply a received remote processing application eCO2 emissions estimated due to each call to a remote processor of the cloud server/system 260 made during operation of a specific software application by the number of those calls made by execution of such a specific software application at the first information handling system 200 over the monitoring period (e.g., one day) to determine a remote processing application CO2 emissions value. In still another example, the CO2 emission tracking system 250 may multiply a received remote memory application eCO2 emissions estimated due to each byte of data stored to a remote memory of the cloud server/system 260 during operation of a specific software application by the number of those bytes stored pursuant to execution of such a specific software application at the first information handling system 200 over the monitoring period (e.g., one day) to determine a remote memory application CO2 emissions value. In still another example, the CO2 emission tracking system 250 may multiply a received internet application eCO2 emissions estimate due to each web engine search or web page visited during operation of a specific software application (e.g., Google Chrome®) by the number of such searches or web pages visited during execution of such a specific software application at the first information handling system 200 over the monitoring period (e.g., one day) to determine a remote internet application CO2 emissions value. In embodiments in which a software application is associated with a remote application CO2 emissions value, the CO2 emissions tracking systems 250 may determine a total application CO2 emissions value by summing the local application CO2 emissions value (e.g., determined based on local power consumption by hardware components during execution of that application) and the remote application CO2 emissions value (e.g., determined based on received estimated CO2 emitted during use of remote processing, networking, or memory resources).

The client device CO2 emission tracking system 250 may gather the information received from the power analytics module 240 and the application analytics module 230 and any determined application CO2 emissions values (e.g., as described directly above), for example as a portion of the carbon footprint or as a portion of power CO2 emission value of the client information handling system into a telemetry for the current monitoring period and transmit that telemetry to the UEM platform 280. The telemetry may thus include a geographic location for the first client information handling system 200 for active power consumption or battery charging where battery power is later used, determined application CO2 emissions values, and software application analytics and hardware power consumption analytics for the first client information handling system 200. A CO2 emission tracking system 271 operating at a second client information handling system 270 may also transmit similar telemetries, indicating software application usage and power usage at the second information handling system 270.

The client device CO2 emission tracking system in an embodiment may transmit the determined current application CO2 emissions value as a percentage of total carbon footprint in the current power CO2 emissions value for the first client information handling system to the UEM platform at block 416 for storage in telemetry. For example, the client device CO2 emission tracking system 250 for the first client information handling system 200 and the client device CO2 emission tracking system 271 at the second client information handling system 270 may transmit determined current application CO2 emissions values for the most recent or current monitoring period to the sustainability engine 281 for storage in telemetry 282. As described in greater detail below with respect to FIG. 5, the client device CO2 emission tracking system 250 may routinely receive previous application CO2 emissions values for the first information handling system 200 or average application CO2 emissions values for a plurality of information handling systems including 271 for comparison with the current application CO2 emissions values. In such a way, the client device CO2 emission tracking system may inform a user of a client information handling system how execution of software applications may impact the carbon footprint of the client information handling system, based on historical performance of the first client information handling system 200 or compared to other client information handling systems (e.g., 270). The method for determining an amount of greenhouse gas emissions that may be attributable to usage at an information handling system of software applications and power may then end.

Figure 5:
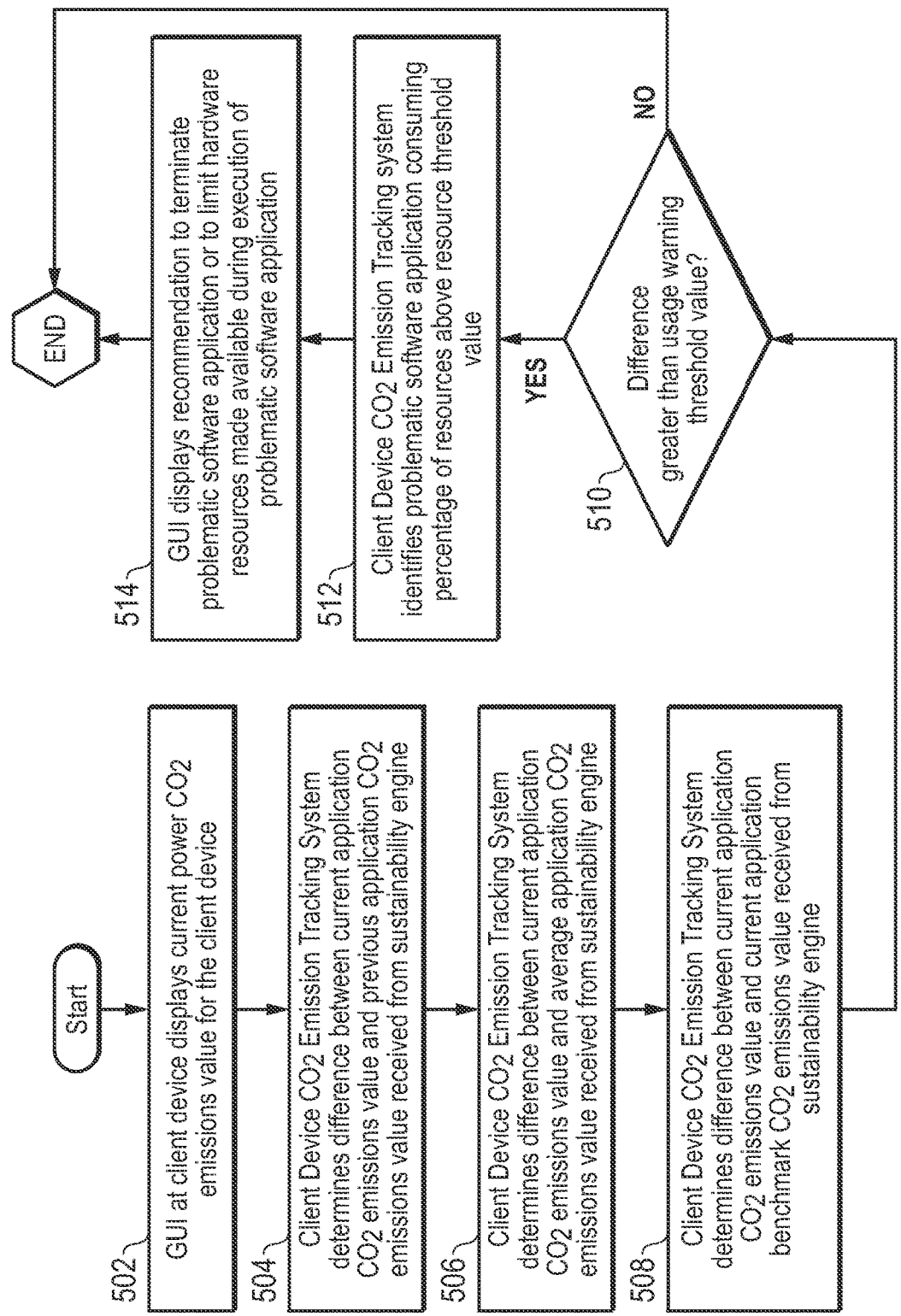
FIG. 5 is a flow diagram illustrating a method of displaying an application CO2 emissions value describing a carbon footprint of a client information handling system according to an embodiment of the present disclosure.

FIG. 5 is a flow diagram illustrating a method of displaying an application CO2 emissions value and a power CO2 emissions value describing a carbon footprint for computing activities of a user of a client information handling system according to an embodiment of the present disclosure. As described herein, the client device CO2 emission tracking system in an embodiment may track an amount of greenhouse gas emissions that may be attributable to usage at an information handling system of software applications and power over time, and make recommendations for application usage that may reduce such emissions.

At block 502, a graphical user interface (GUI) at the client information handling system may display a current power CO2 emissions value as well as a portion of application CO2 emissions value attributable to one or more specific software applications in embodiments herein. For example, in an embodiment described above with reference to FIG. 3, the client device CO2 emissions tracking system in an embodiment may determine current power CO2 emissions values describing CO2 emissions associated with consumption of power by an information handling system over a preset monitoring period. Further, the client device CO2 emissions tracking system may determine current application CO2 emissions values describing CO2 emissions associated with usage of one or more specific software applications at the information handling system over the preset monitoring period in an embodiment. These application CO2 emissions values may be a percentage of the total carbon footprint or power CO2 emissions value attributable to a specific software application executing on the client information handling system in an embodiment. It may also be represented as a carbon generation amount attributable to a software application in an embodiment. Referring to the embodiment of FIG. 3, a graphical user interface (GUI) 300 of the information handling system may then display such determined application CO2 emissions values 330 and power CO2 emission values 340 over time in various representations, as they are determined for each monitoring period (e.g., every 15 minutes). Such determined application CO2 emissions values 330 may be shown for one or more monitoring periods, and power CO2 emissions values 340 may be plotted, for example, against a CO2 emissions axis 310 and a time axis 320.

The client device CO2 emission tracking system in an embodiment may compare a determined current application CO2 emissions value against a previous application CO2 emissions value received from the sustainability engine at block 504. For example, in an embodiment described with reference to FIG. 2, and with reference to FIG. 4 at block 408, the sustainability engine 281 may routinely report previous application CO2 emissions values, for example as a percentage of total carbon footprint for the client information handling system, for a specific information handling system (e.g., 200) to the CO2 emission tracking system 250 in an embodiment. Such a comparison in an embodiment may be useful in identifying when application CO2 emissions values as a percentage of total carbon footprint at a given information handling system (e.g., 200) are out of the norm, which may indicate an adjustment to software usage may be appropriate. For example, the client device CO2 emission tracking system in an embodiment may compare the current application CO2 emissions value, for example as a percentage of total carbon footprint for the client information handling system, to the previous application CO2 emissions value to determine a percentage difference, indicating whether the current value is significantly higher than the previous value across a plurality of other information handling systems.

In another aspect of an embodiment, such a comparison may be made on a component-by-component basis. For example, the client device CO2 emission tracking system in an embodiment may compare the current application processing CO2 emissions value, for example as a percentage of total carbon footprint for the client information handling system, and the previous application processing CO2 emissions value to determine a percentage difference, indicating whether the current value attributable to consumption of resources at the processor 242 is significantly higher than the previous value. As another example, the client device CO2 emission tracking system in an embodiment may compare the current application memory CO2 emissions value, for example as a percentage of total carbon footprint for the client information handling system, and the previous application memory CO2 emissions value to determine a percentage difference, indicating whether the current value attributable to consumption of resources at the memory 246 is significantly higher than the previous value. In yet another example, the client device CO2 emission tracking system in an embodiment may compare the current application networking CO2 emissions value, for example as a percentage of total carbon footprint for the client information handling system, and the previous application networking CO2 emissions value to determine a percentage difference, indicating whether the current value attributable to consumption of resources at the network interface device 220 is significantly higher than the previous value. In still another example, the client device CO2 emission tracking system in an embodiment may determine the current application display CO2 emissions value, for example as a percentage of total carbon footprint for the client information handling system, and the previous application display CO2 emissions value to determine a percentage difference, indicating whether the average value attributable to consumption of resources at the display 245a is significantly higher than the previous value.

At block 506, the client device CO2 emission tracking system in an embodiment may determine a difference between the current application CO2 emissions value, for example as a percentage of total carbon footprint for the client information handling system, and an average application CO2 emissions value received from the sustainability engine. For example, in an embodiment described with reference to FIG. 2, and with reference to FIG. 4 at block 408, the sustainability engine 281 may determine an average application CO2 emissions value, for example as a percentage of total carbon footprint for the client information handling system, for a given monitoring period by taking the average of all application CO2 emissions values most recently gathered across all client information handling systems (e.g., 200 and 270), as a percentage of average power CO2 emissions values indicating the client information handling system carbon footprint, for comparison. In some embodiments, a total carbon footprint may be calculated and attributed to a specific software application as determined from a percentage of total carbon footprint for such reporting instance. The sustainability engine 281 may routinely report such average application CO2 emissions for the most recent monitoring period across a plurality of client information handling systems (e.g., 200 or 270) to the CO2 emission tracking system 250 in an embodiment. Such a comparison in an embodiment may be useful in identifying when application CO2 emissions values at a given information handling system (e.g., 200) are out of the norm, which may indicate an adjustment to software usage may be appropriate. For example, the client device CO2 emission tracking system in an embodiment may compare the current application CO2 emissions value as a percentage of total carbon footprint for the client information handling system to the average application CO2 emissions value to determine a percentage difference, indicating whether the current value from the current client information handling system (e.g., 200) is significantly higher than the average value across a plurality of other information handling systems (e.g., including 200 and 270).

In another aspect of an embodiment, such a comparison may be made on a component-by-component basis. For example, the client device CO2 emission tracking system in an embodiment may compare the current application processing CO2 emissions value as a percentage of total carbon footprint for the client information handling system and the average application processing CO2 emissions value to determine a percentage difference, indicating whether the current value attributable to consumption of resources at the processor 242 is significantly higher than the average value. As another example, the client device CO2 emission tracking system in an embodiment may compare the current application memory CO2 emissions value as a percentage of total carbon footprint for the client information handling system and the average application memory CO2 emissions value to determine a percentage difference, indicating whether the current value attributable to consumption of resources at the memory 246 is significantly higher than the average value. In yet another example, the client device CO2 emission tracking system in an embodiment may compare the current application networking CO2 emissions value as a percentage of total carbon footprint for the client information handling system and the average application networking CO2 emissions value to determine a percentage difference, indicating whether the current value attributable to consumption of resources at the network interface device 220 is significantly higher than the average value. In still another example, the client device CO2 emission tracking system in an embodiment may determine the current application display CO2 emissions value as a percentage of total carbon footprint for the client information handling system and the average application display CO2 emissions value to determine a percentage difference, indicating whether the average value attributable to consumption of resources at the display 245a is significantly higher than the average value.

In an embodiment at block 508, the client device CO2 emission tracking system may determine a difference between the current application CO2 emissions value and a current application benchmark CO2 emissions value. As described in an embodiment with reference to FIG. 2, many software application providers provide general estimates of the GHG emissions associated with the use of their products. These eCO2 emissions may be used to determine application benchmark CO2 emissions values for comparison against the application CO2 emissions value determined by the CO2 emissions tracking system 250 based on concrete measurements of actual execution statistics and power consumption at the first information handling system 200. Such a comparison may assist in identifying when a software application is underperforming or behaving aberrantly, causing high power consumption and increased CO2 emissions.

The CO2 emission tracking system 250 in an embodiment may combine application eCO2 emission estimates with analytics describing software application usage at the first client information handling system 200, specifically, to determine a comparison benchmark CO2 emissions value for one or more software applications over a monitoring period, such as one day. For example, the CO2 emission tracking system 250 may multiply a received application eCO2 emissions estimate due to operation of a specific software application (e.g., gaming application) over a preset time period (e.g., one minute) by the number of those time periods (e.g., minutes) such a specific software application was executing at the first information handling system 200 over the monitoring period (e.g., one day). As another example, the CO2 emission tracking system 250 may multiply a received local processing application eCO2 emissions estimated due to each call to a local CPU 242 made during operation of a specific software application by the number of those calls made by such a specific software application at the first information handling system 200 over the monitoring period (e.g., one day) to determine a local processing application benchmark CO2 emissions value. In still another example, the CO2 emission tracking system 250 may multiply a received local memory application eCO2 emissions estimated due to each byte of data stored to a local memory 246 during operation of a specific software application by the number of those bytes stored pursuant to execution of such a specific software application at the first information handling system 200 over the monitoring period (e.g., one day) to determine a local memory application benchmark CO2 emissions value.

In yet another example, the CO2 emission tracking system 250 may multiply a received networking application eCO2 emissions estimate due to transceiving of each byte of data via the network interface device 220 during operation of a specific software application by the number of those bytes transceived during execution of such a specific software application at the first information handling system 200 over the monitoring period (e.g., one day) to determine a networking application benchmark CO2 emissions value. As yet another example, the CO2 emission tracking system 250 may multiply a received display application eCO2 emissions estimate due to display of information via the display 245*a* during operation of a specific software application by the duration of such display during execution of such a specific software application at the first information handling system 200 over the monitoring period (e.g., one day) to determine a display application benchmark CO2 emissions value.

The CO2 emissions tracking system 250 in an embodiment may compare these current application benchmark CO2 emissions values against current application CO2 emissions values determined based on actual power consumption at the first client information handling system 200 to identify a software application that is underperforming or behaving aberrantly, causing high power consumption and increased CO2 emissions. For example, the client device CO2 emission tracking system in an embodiment may subtract the current application CO2 emissions value from the current application benchmark CO2 emissions value to determine whether the current value determined based on actual power consumption at the information handling system 200 is significantly higher than the estimated value for execution of the software application in an ideal operating environment. In another aspect of an embodiment, such comparisons may be made on a component-by-component basis. For example, the client device CO2 emission tracking system in an embodiment may subtract the current application processing benchmark CO2 emissions value from the current application processing CO2 emissions value to determine whether the current value attributable to actual consumption of resources at the processor 242 is significantly higher than the estimated value associated with optimal or ideal usage of the processor 242. As another example, the client device CO2 emission tracking system in an embodiment may subtract the current application memory benchmark CO2 emissions value from the current application memory CO2 emissions value to determine whether the current value attributable to actual consumption of resources at the memory 246 is significantly higher than the estimated value associated with optimal or ideal usage of the memory 246. In yet another example, the client device CO2 emission tracking system in an embodiment may subtract the current application networking benchmark CO2 emissions value from the current application networking CO2 emissions value to determine whether the current value attributable to actual consumption of resources at the network interface device 220 is significantly higher than the estimated value associated with optimal or ideal usage of the network interface device 220. In still another example, the client device CO2 emission tracking system in an embodiment may subtract the current application display benchmark CO2 emissions value from the current application display CO2 emissions value to determine whether the current value attributable to actual consumption of resources at the display 245*a* is significantly higher than the estimated value associated with optimal or ideal usage of the display 245*a*.

In an embodiment, the client device CO2 emission tracking system may determine at block 510 whether the difference between the current application CO2 emissions value as a percentage of total carbon footprint for the client information handling system and the current application benchmark CO2 emissions value, the previous application CO2 emissions value, or the average application CO2 emissions value is greater than a usage warning threshold value. The significance in difference between the current application CO2 emissions value(s) and the current application benchmark CO2 emissions value(s), the previous application CO2 emissions value(s), or the average application CO2 emissions value(s) (determined as described above with respect to blocks 506 and 508) may be gauged according to a preset usage warning threshold value. Such a preset usage warning threshold value may be used to identify unexpected spikes in resource usage by one or more software applications in an embodiment. For example, the preset usage warning threshold value may be set to 20%, indicating that an adjustment to the usage of software applications may be appropriate when the current application CO2 emissions value differs from the previous application CO2 emissions value by 20% or more. This is only one example of a preset usage warning threshold value, and any other factors or percentages are also contemplated.

If the difference between the current application CO2 emissions value and the current application benchmark CO2 emissions value, the previous application CO2 emissions value, or the average application CO2 emissions value is not greater than a usage warning threshold value, this may indicate that the current software application usage at the client information handling system is in line with expected measurements, and no recommendations for adjustments to that usage may be necessary. The method may then end. If the difference between the current application CO2 emissions value and the current application benchmark CO2 emissions value, the previous application CO2 emissions value, or the average application CO2 emissions value is greater than a usage warning threshold value, it may be appropriate for the client device CO2 emission tracking system to recommend an adjustment in usage of one or more software applications, and the method may proceed to block 514 to determine such a recommendation.

At block 512, in an embodiment in which the difference between the current application $CO_2$ emissions value as a percentage of total carbon footprint and the current application benchmark $CO_2$ emissions value, the previous application $CO_2$ emissions value, or the average application $CO_2$ emissions value is greater than a usage warning threshold value, the client device $CO_2$ emission tracking system may identify a problematic software application consuming a percentage of hardware or network resources above a resource threshold value. As described in an embodiment with respect to FIG. 2, the power analytics module 240 may determine current usage of processing resources by software applications as a percentage of total capacity for the processor 242, current usage of memory resources by software applications as a percentage of total capacity for memory 246, current usage of the display (e.g., percentage of display time in which GUI for a specific software application is visible), or current usage of network interface device resources by software applications as a percentage of total capacity for the network interface device 220 to transceive data (e.g., percentage of total available throughput used). The $CO_2$ emission tracking system 250 in an embodiment may use these received power consumption values, separated according to specific software applications' usages of those resources to determine when a specific software application is consuming an inordinate proportion of a hardware device's resources, possibly increasing power consumed by that device. Each hardware component may be associated with a stored resource threshold value indicating a maximum percentage of that components' resources that should be consumed by any given software application. For example, the processor 242 may be associated with a maximum processor resource threshold value of 85%, indicating that no software application currently executing at the first information handling system 200 should be consuming more than 85% of the processor's 242 resources (e.g., as measured by a percentage of total calls made to that processor 242). As another example, the memory 246 may be associated with a maximum memory resource threshold value of 85%, indicating that no software application currently executing at the first information handling system 200 should be consuming more than 85% of the memory's 246 resources (e.g., as measured by a percentage of total bytes of data stored at the memory 246). In yet another example, the network interface device 220 may be associated with a maximum network interface device resource threshold value of 85%, indicating that no software application currently executing at the first information handling system 200 should be consuming more than 85% of the network interface device's 220 resources (e.g., as measured by a percentage of total throughput transceived by the network interface device 220). In still another example, the display 245*a* may be associated with a maximum display resource threshold value of 85%, indicating that no software application currently executing at the first information handling system 200 should be consuming more than 85% of the display's 245*a* resources (e.g., as measured by a percentage of active screen time used in the display of the specific software application's GUI via the display 245*a*). These percentages of usage by a specific software application of a capacity for a hardware component (e.g., processor 242, memory 246, network interface device 220, etc.) is related to its percentage of consumption of the total carbon footprint of the client information handling system 200, and may be used for a recommendation for the software application to reduce the total carbon footprint of the client information handling system 200.

As described above with reference to FIG. 4 at block 410, the power analytics module 240 may monitor power consumption by each of the various hardware components (e.g., 220, 242, 243, 245*a*, 245*b*, 246, or 247) in an embodiment. In some embodiments, such hardware power consumption may be attributed to specific software applications. For example, the power analytics module 240 in an embodiment may determine current usage of processing resources by software applications as a percentage of total capacity for the processor 242, current usage of memory resources by software applications as a percentage of total capacity for memory 246, current usage of the display by software applications as a percentage of display time in which GUI for a specific software application is visible, or current usage of network interface device resources by software applications as a percentage of total capacity for the network interface device 220 to transceive data (e.g., percentage of total available throughput used).

The client device $CO_2$ emissions tracking system 250 in an embodiment may identify one or more problematic software applications generating an unnecessarily high $CO_2$ emission by comparing these current resource usage measurements against the preset maximum resource threshold values described above. For example, if a gaming software application is currently consuming more than 85% of the resources for the processor 242, the client device $CO_2$ emissions tracking system 250 in an embodiment may identify the gaming application as a problematic software application. As another example, if a streaming video application is currently consuming more than 85% of the resources for the memory 246, the client device $CO_2$ emissions tracking system 250 in an embodiment may identify the streaming video application as a problematic software application. In yet another example, if a video conferencing software application is currently consuming more than 85% of the resources for the network interface device 220, the client device $CO_2$ emissions tracking system 250 in an embodiment may identify the video conferencing software application as a problematic software application. In still another example, if a streaming video application is currently consuming more than 85% of the resources for the display 245*a*, the client device $CO_2$ emissions tracking system 250 in an embodiment may identify the streaming video application as a problematic software application.

The GUI in an embodiment may display at block 514 a recommendation to terminate the problematic software application or to limit hardware or network resources made available during execution of the problematic software application. For example, the GUI 290 may display a recommendation to terminate any background applications identified as problematic software applications. As another example, the GUI 290 in an embodiment in which the client device $CO_2$ emissions tracking system 250 identified the gaming application as a problematic software application for consuming more than 85% of the processor resources may recommend limiting the gaming application's access to processor resources to 85%. In yet another example, the GUI 290 in an embodiment in which the client device $CO_2$ emissions tracking system 250 identified the streaming video application as a problematic software application for consuming more than 85% of the memory resources may recommend limiting the streaming video application's access to memory resources to 85%. As yet another example, the GUI 290 in an embodiment in which the client device $CO_2$ emissions tracking system 250 identified the videoconferencing software application as a problematic software application for consuming more than 85% of the network interface device resources may recommend limiting the videoconferencing software application's access to processor resources to 85%. In still another example, the GUI 290 in an embodiment in which the client device CO2 emissions tracking system 250 identified the streaming video application as a problematic software application for consuming more than 85% of the display resources may recommend limiting the streaming video application's access to display resources to 85%.

In such a way, the client device CO2 emission tracking system may inform a user of a client information handling system how execution of software applications may impact the carbon footprint of the client information handling system and make recommendations for minimizing that carbon footprint, where appropriate. The method for tracking an amount of greenhouse gas emissions that may be attributable to usage at an information handling system of software applications and power over time, and making recommendations for application usage that may reduce such emissions may then end.

The blocks of the flow diagrams of FIGS. 4 and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A carbon dioxide (CO2) emission tracking system operating on a client information handling system comprising:
   a processor executing machine readable code instructions of the CO2 emission tracking system from a non-volatile machine readable medium to:
   gather telemetry over a preset monitoring period including application analytics for a first software application executing at the client information handling system and hardware power consumption analytics for the client information handling system operating at a measured geographic location;
   a network interface device transmitting the telemetry to a Unified Endpoint Management (UEM) platform and receiving from the UEM platform a distributed power CO2 emissions value estimating CO2 emission per Watt of power consumed at the measured geographic location;
   the processor executing machine readable code instructions of the CO2 emission tracking system to:
   determine a power CO2 emissions value estimating CO2 emitted during a measured consumption of power over the preset monitoring period, as described in the hardware power consumption analytics;
   determine an application CO2 emissions value as a portion of the power CO2 emissions value estimating CO2 for the first software application based on a proportion of resources of a hardware component usage contributing to the power CO2 emissions value consumed by the software application; and
   a display displaying, via a graphical user interface (GUI), the application CO2 emissions value and the power CO2 emissions value for the preset monitoring time to provide a carbon footprint for computing activities of the client information handling system.

2. The CO2 emission tracking system of claim 1, wherein the application CO2 emissions value includes a local processing application CO2 emissions value associated with execution of the first software application via the processor.

3. The CO2 emission tracking system of claim 1 further comprising:
   the processor executing machine readable code instructions to determine a remote application CO2 emissions value for execution of the software application via a remote processor, based on the application analytics, wherein the power CO2 emissions value includes the remote application CO2 emissions value.

4. The CO2 emission tracking system of claim 1, wherein the application CO2 emissions value includes a storage portion of the application CO2 emissions value associated with execution of the software application via the memory.

5. The CO2 emission tracking system of claim 1 further comprising:
   the processor executing machine readable code instructions to determine the application CO2 emissions value differs from an application benchmark CO2 emissions value describing an estimated CO2 emissions value for execution of the software application reported from a software provider by a preset usage warning threshold value.

6. The CO2 emission tracking system of claim 5 further comprising:
   the GUI to recommend limiting resources of one or more hardware components available for execution of the software application.

7. The CO2 emission tracking system of claim 1 further comprising:
   a location sensor to detect the measured geographic location during a charging of a battery for the client information handling system; and
   the processor executing machine readable code instructions to determine the power CO2 emissions value estimating CO2 emitted during the measured consumption of power via the battery.

8. A method of tracking carbon dioxide (CO2) emission on a client information handling system comprising:
gathering current telemetry over a current monitoring period, via a processor executing machine readable code instructions of a CO2 emission tracking system from a non-volatile machine readable medium, including application analytics for a plurality of software applications executing at the client information handling system and hardware power consumption analytics for the client information handling system operating at a measured geographic location;
receiving, via a network interface device, from a Unified Endpoint Management (UEM) platform, a distributed power CO2 emissions value estimating CO2 emission per Watt of power consumed at the measured geographic location;
executing machine readable code instructions of the CO2 emission tracking system determine a current power CO2 emissions value estimating CO2 emitted during a measured consumption of power over the current monitoring period, as described in the hardware power consumption analytics;
determining a current application CO2 emissions value as a portion of the power CO2 emissions value, estimating CO2 emitted by a first software application from the plurality of software applications based on a proportion of resources of a hardware component contributing to the power CO2 emissions value consumed by the first software application;
determining the current local application CO2 emissions value differs from previous local application CO2 emissions value determined during a previous monitoring period by a preset usage warning threshold value; and
recommending, via the GUI, limiting resources of one or more hardware components available for execution of the first software application.

9. The method of claim 8, wherein the current application CO2 emissions value includes a current networking portion of the application CO2 emissions value associated with execution of the first software application via the network interface device.

10. The method of claim 8, wherein the application CO2 emissions value includes a display portion of the application CO2 emissions value associated with execution of the first software application via a display of content from the first software application on the client information handling system.

11. The method of claim 8 further comprising:
determining, via the processor executing machine readable code instructions, that a current processor portion of the application CO2 emissions value for the first software application differs from a previous processor portion of the application CO2 emissions value for the first software application during a previous monitoring period; and
recommending, via the GUI, limiting resources of the processor available for execution of the first software application.

12. The method of claim 8 further comprising:
determining, via the executing machine readable code instructions, that the application CO2 emissions value differs from an application benchmark CO2 emissions value describing an estimated CO2 emissions value for execution of the software application reported from a software provider by a deviation threshold value.

13. The method of claim 12 further comprising:
recommending, via the GUI, limiting resources of one or more hardware components available for execution of the software application.

14. The method of claim 8 further comprising:
detect a location sensor to the measured geographic location during a charging of a battery for the client information handling system; and
executing machine readable code instructions via the processor to determine the power CO2 emissions value estimating CO2 emitted during the measured consumption of power via the battery.

15. A carbon dioxide (CO2) emission tracking system operating on a first client information handling system comprising:
a processor executing machine readable code instructions of the CO2 emission tracking system from a non-volatile machine readable medium to:
gather current telemetry over a monitoring period including application analytics for a first software application executing at the first client information handling system and hardware power consumption analytics for the first client information handling system operating at a measured geographic location;
a network interface device receiving from a Unified Endpoint Management (UEM) platform a distributed power CO2 emissions value estimating CO2 emission per Watt of power consumed at the measured geographic location;
the processor executing machine readable code instructions of the CO2 emission tracking system to:
determine a power CO2 emissions value estimating CO2 emitted during a measured consumption of power over the monitoring period, as described in the hardware power consumption analytics;
determine an application CO2 emissions value as a portion of the power CO2 emissions value, estimating CO2 emitted by the first software application based on a proportion of resources of a hardware component contributing to the power CO2 emissions value consumed by the first software application during the monitoring period;
determine that the application CO2 emissions value differs from an average application CO2 emissions value determined during at least one previous monitoring period by a preset usage warning threshold value; and
a display device displaying, via a graphic user interface (GUI), the application CO2 emissions value for the first software application.

16. The CO2 emission tracking system of claim 15 further comprising:
the processor executing machine readable code instructions to determine that the local application CO2 emissions value differs from an average application CO2 emissions value determined during previous monitoring periods from across a plurality of other client information handling systems by a preset usage warning threshold value.

17. The CO2 emission tracking system of claim 15 further comprising:
the display device displaying, via the graphic user interface (GUI) a recommendation to limit resources of one or more hardware components available for execution of the first software application.

18. The CO2 emission tracking system of claim 15 further comprising:
- the processor executing machine readable code instructions to determining that a networking portion of the application CO2 emissions value for the first software application differs from an average networking portion of the application CO2 emissions value for the software application from previous monitoring periods; and
- the display device to display a recommendation to limit resources of the network interface device available for execution of the first software application.

19. The CO2 emission tracking system of claim 15 further comprising:
- a location sensor to detect the measured geographic location during a most-recent charging of a battery for the client information handling system; and
- the processor executing machine readable code instructions to determine the power CO2 emissions value estimating CO2 emitted during the measured consumption of power via the battery.

20. The CO2 emission tracking system of claim 15 further comprising:
- the processor executing machine readable code instructions to determine a remote application CO2 emissions value for execution of the first software application via remote resources, based on the application analytics, wherein the power CO2 emissions value includes the remote application CO2 emissions value.

* * * * *